(12) United States Patent
Sirpal et al.

(10) Patent No.: US 8,732,373 B2
(45) Date of Patent: May 20, 2014

(54) SYSTEMS AND METHODS RELATING TO USER INTERFACES FOR DOCKING PORTABLE ELECTRONIC

(75) Inventors: Sanjiv Sirpal, Oakville (CA); Brian Reeves, Hamilton (CA); Paul Reeves, Oakville (CA); Rodney Schrock, San Diego, CA (US); David Reeves, Ancaster (CA); Richard Teltz, Hamilton (CA); Kean Wing Kin Lam, Richmond Hill (CA)

(73) Assignee: Z124, George Town (KY)

( * ) Notice: Subject to any disclaimer, the term of this patent is extended or adjusted under 35 U.S.C. 154(b) by 151 days.

(21) Appl. No.: 13/252,012

(22) Filed: Oct. 3, 2011

(65) Prior Publication Data
US 2012/0117290 A1    May 10, 2012

Related U.S. Application Data

(60) Provisional application No. 61/389,087, filed on Oct. 1, 2010.

(51) Int. Cl.
*G06F 13/00* (2006.01)

(52) U.S. Cl.
USPC .......................................... 710/303; 710/304

(58) Field of Classification Search
USPC ................................................. 710/303, 304
See application file for complete search history.

(56) References Cited

U.S. PATENT DOCUMENTS

| 5,191,644 | A | * | 3/1993 | Takeda | 715/790 |
| 5,689,654 | A | | 11/1997 | Kikinis et al. | |
| 5,825,336 | A | * | 10/1998 | Fujita et al. | 345/2.3 |
| 5,884,049 | A | | 3/1999 | Atkinson | |
| 6,008,867 | A | * | 12/1999 | Cooper et al. | 348/705 |
| 6,226,165 | B1 | | 5/2001 | Collins et al. | |
| 6,309,230 | B2 | | 10/2001 | Helot | |
| 6,538,880 | B1 | | 3/2003 | Kamijo et al. | |
| 7,552,187 | B2 | * | 6/2009 | Fuchs | 709/208 |
| 7,627,343 | B2 | | 12/2009 | Fadell | |
| 7,719,830 | B2 | | 5/2010 | Howarth | |
| 7,954,068 | B2 | * | 5/2011 | Riggs et al. | 715/838 |
| 2002/0119800 | A1 | | 8/2002 | Jaggers et al. | |

(Continued)

FOREIGN PATENT DOCUMENTS

| FR | 2816093 A1 * | 5/2002 | G06F 9/30 |
| JP | 2008206210 A * | 9/2008 | H04N 5/00 |

(Continued)

OTHER PUBLICATIONS

U.S. Appl. No. 13/251,768, filed Oct. 3, 2011, Bosse.

(Continued)

*Primary Examiner* — Faisal M Zaman
(74) *Attorney, Agent, or Firm* — Sheridan Ross P.C.

(57) ABSTRACT

Systems and methods related to the user interface of docking portable electronic devices. A master device may be docked with a slave device to control operation of the slave device. The master device may be operable to display a user interface. The user interface of the master device may be adapted to be used with the slave device that may include different display and/or input devices than that of the master device. In one embodiment, the master device may be a handheld device such as a smart phone and the slave device may be a tablet device.

20 Claims, 28 Drawing Sheets

(56) References Cited

U.S. PATENT DOCUMENTS

| | | | |
|---|---|---|---|
| 2002/0140635 A1* | 10/2002 | Saitou et al. | 345/30 |
| 2003/0025678 A1 | 2/2003 | Lee et al. | |
| 2003/0041206 A1 | 2/2003 | Dickie | |
| 2004/0004603 A1 | 1/2004 | Gerstner et al. | |
| 2004/0019724 A1 | 1/2004 | Singleton et al. | |
| 2004/0150581 A1* | 8/2004 | Westerinen et al. | 345/1.3 |
| 2004/0201621 A1* | 10/2004 | Stevens | 345/751 |
| 2005/0083642 A1* | 4/2005 | Senpuku et al. | 361/681 |
| 2005/0111182 A1 | 5/2005 | Lin et al. | |
| 2005/0185364 A1 | 8/2005 | Bell et al. | |
| 2006/0007114 A1* | 1/2006 | Shiraishi | 345/103 |
| 2006/0082518 A1* | 4/2006 | Ram | 345/1.1 |
| 2006/0116164 A1* | 6/2006 | Kang | 455/557 |
| 2006/0164542 A1* | 7/2006 | Kondo | 348/383 |
| 2006/0236014 A1 | 10/2006 | Yin et al. | |
| 2007/0120763 A1* | 5/2007 | De Paepe et al. | 345/1.3 |
| 2007/0124792 A1* | 5/2007 | Bennett et al. | 725/133 |
| 2007/0198760 A1 | 8/2007 | Han | |
| 2007/0242421 A1 | 10/2007 | Goschin et al. | |
| 2008/0072163 A1* | 3/2008 | Teng et al. | 715/761 |
| 2008/0100531 A1* | 5/2008 | Yoshinaga et al. | 345/1.3 |
| 2008/0284907 A1* | 11/2008 | Chiao | 348/448 |
| 2009/0027344 A1* | 1/2009 | Matsunaga et al. | 345/168 |
| 2009/0178097 A1 | 7/2009 | Kim et al. | |
| 2009/0187677 A1 | 7/2009 | Hunt et al. | |
| 2009/0287832 A1* | 11/2009 | Liang et al. | 709/228 |
| 2010/0257559 A1* | 10/2010 | Friedlander et al. | 725/40 |
| 2010/0323786 A1* | 12/2010 | Smith | 463/25 |
| 2010/0333041 A1* | 12/2010 | Fabrick, II | 715/862 |
| 2011/0004827 A1* | 1/2011 | Doerr et al. | 715/735 |
| 2011/0055676 A1* | 3/2011 | Sun et al. | 715/201 |
| 2011/0095965 A1* | 4/2011 | Yoneoka et al. | 345/1.1 |
| 2011/0210922 A1* | 9/2011 | Griffin | 345/173 |
| 2012/0081267 A1 | 4/2012 | Sirpal et al. | |
| 2012/0081268 A1 | 4/2012 | Sirpal et al. | |
| 2012/0081269 A1 | 4/2012 | de Paz | |
| 2012/0081270 A1 | 4/2012 | Gimpl et al. | |
| 2012/0081271 A1 | 4/2012 | Gimpl et al. | |
| 2012/0081277 A1 | 4/2012 | de Paz | |
| 2012/0081278 A1 | 4/2012 | Freedman | |
| 2012/0081280 A1 | 4/2012 | Schrock et al. | |
| 2012/0081289 A1 | 4/2012 | Sirpal et al. | |
| 2012/0081292 A1 | 4/2012 | Sirpal et al. | |
| 2012/0081293 A1 | 4/2012 | Sirpal et al. | |
| 2012/0081302 A1 | 4/2012 | Gimpl et al. | |
| 2012/0081303 A1 | 4/2012 | Cassar et al. | |
| 2012/0081304 A1 | 4/2012 | Sirpal et al. | |
| 2012/0081305 A1 | 4/2012 | Schrock | |
| 2012/0081306 A1 | 4/2012 | Sirpal et al. | |
| 2012/0081307 A1 | 4/2012 | Sirpal et al. | |
| 2012/0081308 A1 | 4/2012 | Sirpal | |
| 2012/0081309 A1 | 4/2012 | Sirpal et al. | |
| 2012/0081310 A1 | 4/2012 | Schrock | |
| 2012/0081311 A1 | 4/2012 | Sirpal et al. | |
| 2012/0081312 A1 | 4/2012 | Sirpal et al. | |
| 2012/0081313 A1 | 4/2012 | Sirpal et al. | |
| 2012/0081314 A1 | 4/2012 | Sirpal et al. | |
| 2012/0081315 A1 | 4/2012 | Sirpal | |
| 2012/0081316 A1 | 4/2012 | Sirpal et al. | |
| 2012/0081317 A1 | 4/2012 | Sirpal et al. | |
| 2012/0081318 A1 | 4/2012 | Sirpal et al. | |
| 2012/0081319 A1 | 4/2012 | Gimpl et al. | |
| 2012/0081322 A1 | 4/2012 | Sirpal et al. | |
| 2012/0081323 A1 | 4/2012 | Sirpal et al. | |
| 2012/0081397 A1 | 4/2012 | de Paz | |
| 2012/0081398 A1 | 4/2012 | Sirpal et al. | |
| 2012/0081399 A1 | 4/2012 | Sirpal et al. | |
| 2012/0081400 A1 | 4/2012 | Schrock | |
| 2012/0081401 A1 | 4/2012 | Sirpal et al. | |
| 2012/0081403 A1 | 4/2012 | Sirpal et al. | |
| 2012/0081854 A1 | 4/2012 | Sirpal et al. | |
| 2012/0083319 A1 | 4/2012 | Sirpal et al. | |
| 2012/0084673 A1 | 4/2012 | Sirpal et al. | |
| 2012/0084674 A1 | 4/2012 | Visosky | |
| 2012/0084675 A1 | 4/2012 | Sirpal et al. | |
| 2012/0084676 A1 | 4/2012 | de Paz | |
| 2012/0084677 A1 | 4/2012 | Sirpal et al. | |
| 2012/0084678 A1 | 4/2012 | Sirpal et al. | |
| 2012/0084679 A1 | 4/2012 | Sirpal et al. | |
| 2012/0084680 A1 | 4/2012 | Gimpl et al. | |
| 2012/0084681 A1 | 4/2012 | Cassar | |
| 2012/0084682 A1 | 4/2012 | Sirpal et al. | |
| 2012/0084686 A1 | 4/2012 | Sirpal et al. | |
| 2012/0084687 A1 | 4/2012 | Sirpal et al. | |
| 2012/0084690 A1 | 4/2012 | Sirpal et al. | |
| 2012/0084693 A1 | 4/2012 | Sirpal et al. | |
| 2012/0084694 A1 | 4/2012 | Sirpal et al. | |
| 2012/0084697 A1 | 4/2012 | Reeves | |
| 2012/0084698 A1 | 4/2012 | Sirpal et al. | |
| 2012/0084699 A1 | 4/2012 | Sirpal et al. | |
| 2012/0084700 A1 | 4/2012 | Sirpal et al. | |
| 2012/0084701 A1 | 4/2012 | Sirpal et al. | |
| 2012/0084706 A1 | 4/2012 | Sirpal et al. | |
| 2012/0084709 A1 | 4/2012 | Sirpal | |
| 2012/0084710 A1 | 4/2012 | Sirpal et al. | |
| 2012/0084712 A1 | 4/2012 | Gimpl et al. | |
| 2012/0084714 A1 | 4/2012 | Sirpal et al. | |
| 2012/0084715 A1 | 4/2012 | Sirpal et al. | |
| 2012/0084716 A1 | 4/2012 | Sirpal et al. | |
| 2012/0084718 A1 | 4/2012 | Gimpl et al. | |
| 2012/0084719 A1 | 4/2012 | Sirpal et al. | |
| 2012/0084720 A1 | 4/2012 | Sirpal et al. | |
| 2012/0084721 A1 | 4/2012 | Gimpl et al. | |
| 2012/0084722 A1 | 4/2012 | Cassar et al. | |
| 2012/0084723 A1 | 4/2012 | Reeves et al. | |
| 2012/0084724 A1 | 4/2012 | Sirpal et al. | |
| 2012/0084725 A1 | 4/2012 | Sirpal et al. | |
| 2012/0084726 A1 | 4/2012 | Sirpal et al. | |
| 2012/0084727 A1 | 4/2012 | Sirpal et al. | |
| 2012/0084735 A1 | 4/2012 | Sirpal | |
| 2012/0084736 A1 | 4/2012 | Sirpal | |
| 2012/0084737 A1 | 4/2012 | Gimpl et al. | |
| 2012/0084738 A1 | 4/2012 | Sirpal | |
| 2012/0084739 A1 | 4/2012 | Sirpal et al. | |
| 2012/0084791 A1 | 4/2012 | Benedek et al. | |
| 2012/0105363 A1 | 5/2012 | Sirpal et al. | |
| 2012/0110486 A1 | 5/2012 | Sirpal et al. | |
| 2012/0110497 A1 | 5/2012 | Gimpl et al. | |
| 2012/0117495 A1 | 5/2012 | Sirpal et al. | |
| 2012/0124490 A1 | 5/2012 | Sirpal et al. | |
| 2012/0144323 A1 | 6/2012 | Sirpal et al. | |
| 2012/0174028 A1 | 7/2012 | Sirpal et al. | |
| 2012/0240056 A1 | 9/2012 | Webber | |
| 2012/0266098 A1 | 10/2012 | Webber | |
| 2013/0021262 A1 | 1/2013 | Chen | |
| 2013/0076598 A1 | 3/2013 | Sirpal et al. | |
| 2013/0078994 A1 | 3/2013 | Jouin | |
| 2013/0078995 A1 | 3/2013 | Jouin | |
| 2013/0079054 A1 | 3/2013 | Jouin | |
| 2013/0198867 A1 | 8/2013 | Ricci et al. | |
| 2013/0201078 A1 | 8/2013 | Russello | |
| 2013/0207598 A1 | 8/2013 | Teltz et al. | |
| 2013/0273970 A1 | 10/2013 | Selim | |
| 2013/0275642 A1 | 10/2013 | Teltz | |
| 2013/0275643 A1 | 10/2013 | Teltz | |

FOREIGN PATENT DOCUMENTS

| | | | | |
|---|---|---|---|---|
| JP | 2010271713 A | * | 12/2010 | G09F 9/00 |
| JP | 2012138067 A | * | 7/2012 | G06F 1/16 |
| WO | WO 9821709 A1 | * | 5/1998 | G09G 5/00 |
| WO | WO 2009006535 A1 | * | 1/2009 | G06F 1/16 |
| WO | WO 2009037588 A2 | * | 3/2009 | G06F 1/16 |

OTHER PUBLICATIONS

U.S. Appl. No. 13/627,132, filed Sep. 26, 2012, Teltz.
U.S. Appl. No. 13/364,152, filed Feb. 1, 2012, Sirpal et al.
U.S. Appl. No. 13/408,828, filed Feb. 29, 2012, Sirpal et al.
U.S. Appl. No. 13/408,839, filed Feb. 29, 2012, Sirpal et al.
Google Image Result Fujitsu Dual Screen Phone, published date unknown, [retrieved Apr. 18, 2011], 1 page. Retrieved from: www.google.com/imgres?imgurl=http://www.computerriver.com/images/dual-screen-phone.jpg.

(56) References Cited

OTHER PUBLICATIONS

Google Image Result for LG Dual Touch Screen Concept Phone by Eugene Kim, published date unknown, [retrieved Apr. 18, 2011], 1 page. Retrieved from: www.google.com/imgres?imgurl=http://fgadgets.com/wp-content/uploads/2010/08/lg-dual-touch-screen-phone-Eugene-Kim-01.jpg.

Google Image Result for Fujitsu Dual Screen Phone, published date unknown, [retrieved Apr. 18, 2011], 1 page. Retrieved from: www.google.com/imgres?imgurl=http://www.gsmdome.com/wp-content/uploads/2010/10/fujitsu-dual-screen-phone__w2cP7__54.jpg.

Google Image Result for Kyocera Echo, published date unknown, [retrieved Apr. 18, 2011], 1 page. Retrieved from: www.google.com/imgres?imgurl=http://www.hardwaresphere.com/wp-content/uploads/2011/02/kyocera-echo-dual-screen-android-phone-for-sprint-network.jpg.

Google Image Result for HTC Triple Viper, published date unknown, [retrieved Apr. 18, 2011], 1 page. Retrieved from:www.google.com/imgres?imgurl=http://www.santafemods.com/Forum/AndroidForums/htcTripleViper.png.

Google Image Result for Dual-Screen Phone, [retrieved Apr. 18, 2011], 1 page. Retrieved from: www.google.com/imgres?imgurl=http://www.netshet.org/wp-content/uploads/2011/02/Dual-Scree . . . .

Website entitled, "Kyocera Echo," Kyocera Communications, Inc., 2011, [retrieved on Aug. 27, 2012], 6 pages. Retrieved from: www.echobykyocera.com/.

Website entitled "Lapdock™ for Motorola ATRIX," Motorola Mobility, Inc, 2011, [retrieved on Apr. 18, 2011], 1 page. Retrieved from: www.motorola.com/Consumers/US-EN/Consumer-Product-and-Services/Mobile . . . .

Website entitled "Motorola ATRIX 4G Laptop Dock Review," phoneArena.com, posted Mar. 2, 2011, [retrieved on Apr. 18, 2011], 6 pages. Retrieved from: www.phonearena.com/reviews/Motorola-ATRIX-4G-Laptop-Dock-Review__id2667.

Website entitled, "Sony Tablet," Sony Corporation, 2012, [retrieved on Aug. 27, 2012], 3 pages. Retrieved from: www.store.sony.com/webapp/wcs/stores/servlet/CategoryDisplay?catalogId=10551&storeId=10151&langId=-1&categoryId=8198552921644795521.

Burns, C., "Motorola ATRIX 4G Laptop Dock Review," Android Community, Feb. 20, 2011, [retrieved on Apr. 18, 2011], 5 pages. Retrieved from: www.androidcommunity.com/motorola-atrix-4g-laptop-dock-review-20110220/.

Catacchio, "This smartphone has two huge screens . . . that rotate," The Next Web, Inc., Oct. 7, 2010, [retrieved on Jul. 21, 2011], 2 pages. Retrieved from: www.thenextweb.com/asia/2010/10/07/this-smartphone-has-two-huge-screens-that-rotate/.

Posted by Harman03, "Kyocera Echo Dual-screen Android Phone," posted 4 weeks from Apr. 18, 2011, [retrieved on Apr. 18, 2011], 3 pages. Retrieved from: www.unp.me/f106/kyocera-echo-dual-screen-android-phone-143800/.

Stein, S., "How does the Motorola Atrix 4G Lapdock compare with a laptop?" Crave—CNET, Feb. 9, 2011 [retrieved on Apr. 18, 2011], 7 pages. Retrieved from: www.news.cnet.com/8301-17938__105-20031251-1.html.

International Search Report and Written Opinion for International (PCT) Patent Application No. PCT/US2011/054609, mailed Oct. 23, 2012 10 pages.

International Search Report and Written Opinion for International (PCT) Patent Application No. PCT/US2011/054643, mailed Apr. 24, 2012 9 pages.

"Bluetooth," Wikipedia, printed Jun. 8, 2012, 11 pages (found at http://en.wikipedia.org/wiki/Bluetooth).

"Cryptography" Wikipedia, published date unknown, 10 pages [retrieved from Internet Archive capture, Nov. 27, 2011 at http://web.archive.org/web/20111127000223/http://en.wikipedia.org/wiki/Cryptography].

"Key (cryptography)" Wikipedia, published date unknown, 3 pages [retrieved from Internet Archive capture, Nov. 26, 2011 at http://web.archive.org/web/20111126235921/http://en.wikipedia.org/wiki/Key__%28cryptography%29].

Layton "How Remote Controls Work," HowStuffWorks, published date unknown, 4 pages [retrieved from Internet Archive Dec. 19, 2011 capture, http//web.archive.org/web/20111219132400/http://electronics.howstuffworks.com/remote-control2.htm/printable].

International Preliminary Report on Patentability for International (PCT) Patent Application No. PCT/US2011/054609, mailed Apr. 11, 2013 7 pages.

International Preliminary Report on Patentability for International (PCT) Patent Application No. PCT/US2011/054643, mailed Apr. 11, 2013 6 pages.

Official Action for U.S. Appl. No. 13/251,768, mailed Jun. 18, 2013 10 pages.

Official Action for U.S. Appl. No. 13/251,768, mailed Oct. 16, 2013 10 pages.

\* cited by examiner

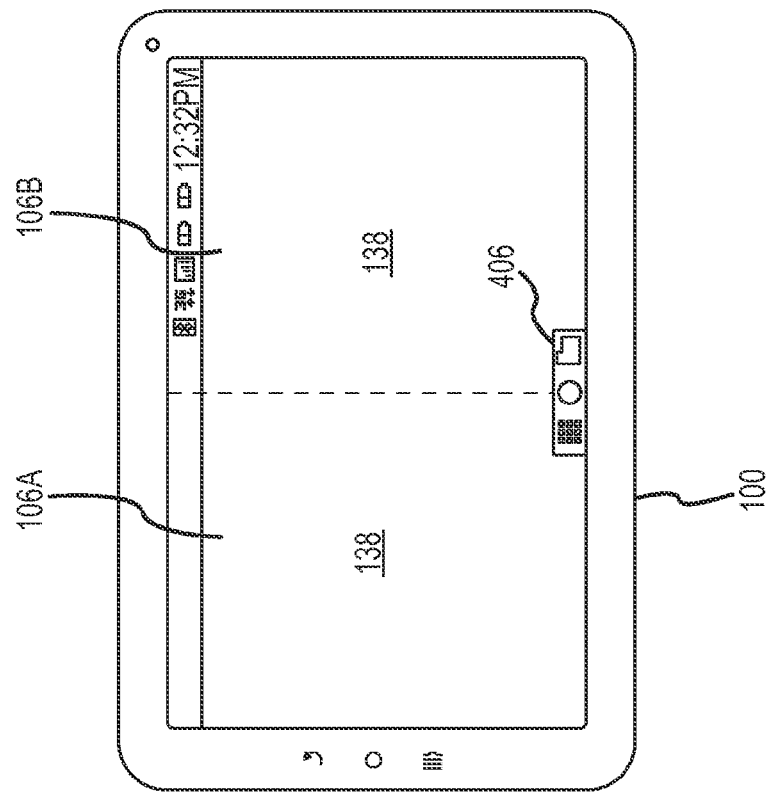
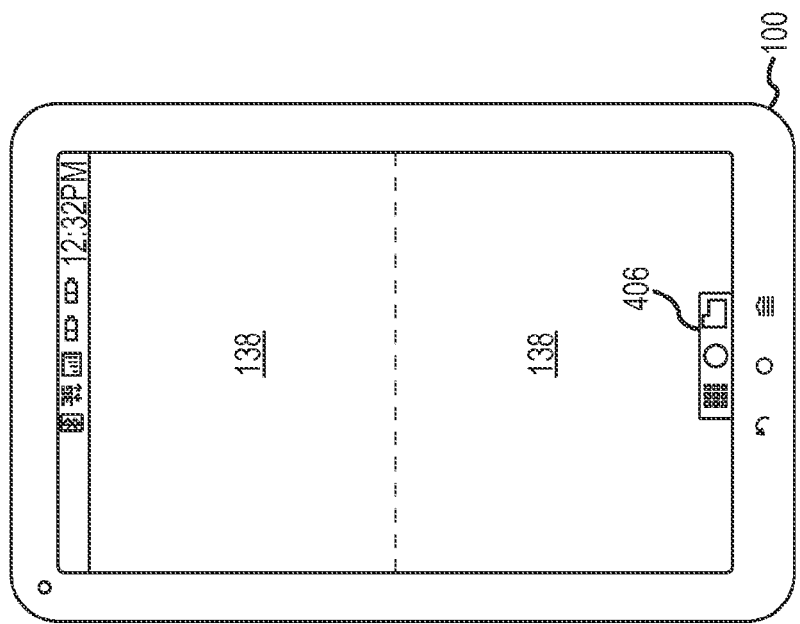
FIG. 22

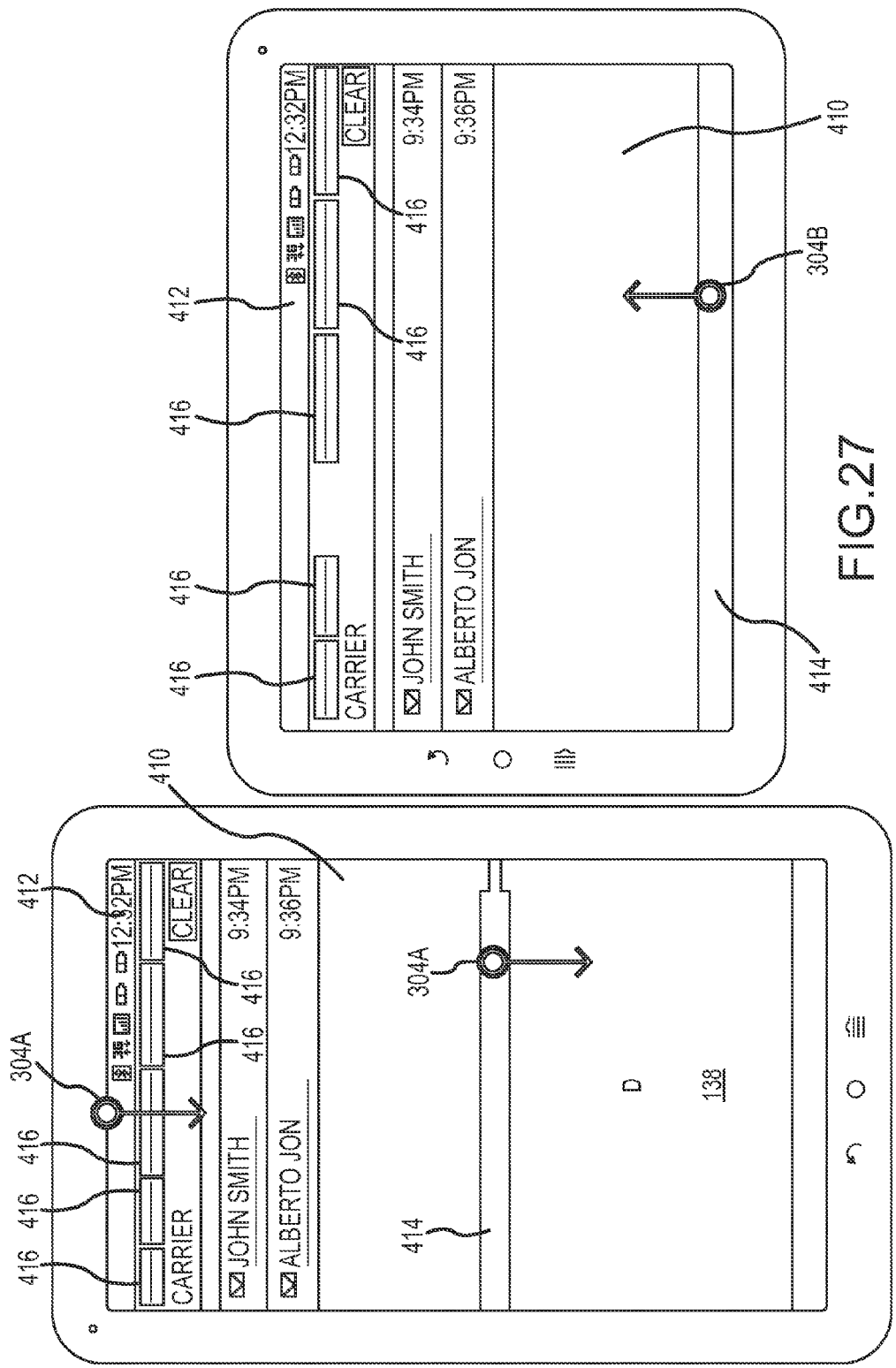

SYSTEMS AND METHODS RELATING TO USER INTERFACES FOR DOCKING PORTABLE ELECTRONIC

CROSS REFERENCE TO RELATED APPLICATIONS

This application claims priority to U.S. Provisional Application No. 61/389,087 filed Oct. 1, 2010 entitled "TABLET COMPUTING USER INTERFACE", the entirety of which is incorporated by reference herein.

BACKGROUND

The prevalence of portable electronic devices has increased in recent years. Also, the performance capabilities of portable electronic devices have increased in recent years. For example, more powerful processors, improved wireless radios, increased memory capacities, and other increases in performance have been realized in portable electronic devices. Accordingly, the number and variety of tasks that can be performed with portable electronic devices has also increased.

Additionally, portable electronic devices having different form factors have been proposed. For example, a number of tablet devices have been proposed that may present advantages over smaller handheld electronic devices (such as smart phones, personal digital assistants (PDAs), etc.). For instance, tablets often make use of larger displays than handheld electronic devices. In this regard, tablets may present a larger display area that may facilitate added features (e.g., more robust graphical user interfaces may be developed for use with tablet devices). Additionally, because the overall size of tablet devices is often larger than handheld electronic devices, larger, more powerful batteries may be provided that have longer battery life than batteries of handheld electronic devices. As such, tablet devices may be able to operate for longer durations than handheld electronic devices.

However, tablets may also suffer from a number of drawbacks when compared to handheld electronic devices. For example, tablets, while potentially more convenient than many laptop or desktop computers, may not demonstrate the same convenience of handheld electronic devices. Additionally, in many cases, handheld electronic devices may be used as telephones or include wireless radios that enable communication with a cellular network (e.g., including both voice and data network capabilities). While some tablets include some form of wireless radio (e.g., 802.11, Bluetooth, etc.), many do not include wireless radios for communication with a cellular network. Those tablets that do include cellular radios often require an additional arrangement (e.g., an additional contract or a unique SIM card) with a service provider in order to utilize the cellular network with the tablet device and often can only use of the data capabilities of the cellular network.

Users often employ both tablet and handheld devices. For example, which device a user employs may depend upon the specific context of use. In this regard, a user may desire continuity of data across the devices employed. However, the ability to provide continuity of data across the multiple devices may be burdensome. For example, an individual may begin a task utilizing a handheld electronic device and wish to continue the task utilizing another device (e.g., a tablet device). However, the ability to transition performance of the task from the handheld electronic device to the tablet device may prove difficult. Some proposed solutions include, for example, cloud computing, server-based solutions, and other means of synching data across multiple devices. However, these proposed solutions often require costly subscriptions or complicated hardware setups to accomplish such services. Furthermore, the continuity of the task being performed may be interrupted (e.g., requiring the progress of the task to be saved and reopened on the other device) as opposed to "on the fly" changes of devices. As such, these solutions often present a large cost burden, may introduce security concerns regarding sensitive data, and may interrupt the continuity of tasks performed using the devices.

Additionally, as the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

A substantial number of handheld computing devices make use of a small touch screen display to deliver display information to the user and to receive inputs from the user. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

In this regard, the popularity of tablets has continued to grow because tablets may offer solutions to the issue of limited screen space addressed above. However, the issues regarding the ability to synch data across devices remains a concern. One solution that has been proposed includes the docking of a master handheld device with a slave tablet device. Such an approach is described in U.S. patent application Ser. No. 13/251,768 filed Oct. 3, 2011 entitled "SYSTEMS AND METHODS FOR DOCKING PORTABLE ELECTRONIC DEVICES", the entirety of which is incorporated by reference herein.

SUMMARY

One aspect presented herein includes a method for use with docking portable electronic devices. The method includes displaying on a master device a user interface. A plurality of screens are displayed on corresponding ones of a plurality of master device displays. The method further includes docking the master device with a slave device and adapting the user interface to be displayed on a slave device display. The method further includes dividing the slave device display into a plurality of display portions, each of the portions corresponding to a respective one of the plurality of master device displays. Each screen displayed on one of the plurality of a master device displays is displayed on one of the plurality of display portions of the slave device display.

A number of feature refinements and additional features are applicable to the first aspect. These feature refinements and additional features may be used individually or in any combination. As such, each of the following features that will be discussed may be, but are not required to be, used with any other feature or combination of features of the aspects presented herein.

In one embodiment, the plurality of screens may correspond to one or more applications executing on the master device. Furthermore, the docking may include establishing communication between the master device and one or more hardware components of the slave device. Additionally, the adapting may comprise resizing at least one of the screens to be displayed on the slave device display. Further still, the adapting may comprise changing the orientation of the screen to be displayed on the slave device display.

The slave device may be responsive to gesture inputs to control the display of the plurality of screens on the plurality of display portions of the slave device display when the master device is docked with the slave device. This control may be in a manner corresponding to the control of the plurality screens on the plurality of master device displays when the master device is not docked with the slave device. The dividing may comprise allocating at least a first display area of the slave device display to a first portion and at least a second display area of the slave device display of the slave device display to a second portion. The first display portion may correspond to a first master device display and the second display portion may correspond to a second master device display.

In one embodiment, the master device may comprise a handheld device and the slave device may comprise a tablet.

A second aspect includes a system for docking of portable electronic devices. The system includes a master device having a plurality of master device displays. The plurality of master device displays are operable to display one or more screens thereon. The system further includes a slave device having a slave device display. The slave device is operable to receive the master device in a docked position. When in the docked position, the master device is in operative communication with the slave device display. Additionally, when in the docked position, the master device is operable to divide the slave device display into a plurality of display portions corresponding with the plurality of master device displays. The one or more screens displayed on the plurality of master device displays are displayable on the plurality of corresponding ones of the plurality of display portions of the slave device display.

A third aspect includes a slave device. The slave device includes a slave device display and a docking member operable to receive a master device in a docked position. When in the docked position, the master device is in operable communication with the slave device display. Also, when in said docked position, the master device is operable to divide the slave device display into a plurality of display portions corresponding with a plurality of master device displays. One or more screens displayed on the plurality of master device displays are displayable on the corresponding portions of the slave device display.

A fourth aspect includes a master device. The master device includes a plurality of master device displays that are operable to display one or more screens thereon. The master device also includes a communication port operable to establish operative communication with a slave device having a slave device display. The master device is receivably engageable with the slave device in a docked position. When in the docked position, the master device is in operative communication with the slave device display. Also, when in said docked position, said master device is operable to divide the slave device display into a plurality of display portions corresponding with the plurality of master device displays. The one or more screens displayed on the plurality of master device displays are displayable on the corresponding portions of the slave device display.

A number of feature refinements and additional features are applicable to the second, third, and fourth aspects. These feature refinements and additional features may be used individually or in any combination. As such, each of the following features that will be discussed may be, but are not required to be, used with any other feature or combination of features of the aspects presented herein.

In one embodiment, the master device may be a handheld device and the slave device may be a tablet device. The handheld device may include a first display and a second display. The slave device display may be divided into a first display portion corresponding to the first display and a second display portion corresponding to the second display. At least one of the one or more screens is resized when displayed on a corresponding one of the plurality of display portion of the slave device display. Additionally, an orientation of at least one of the one or more screens may be changed when displayed on a corresponding one of the plurality of display portions of the slave device display.

In one embodiment, when not in the docked position, the master device may be operable to control the display of the one or more screens on the plurality of master device displays in response to received gesture inputs. Also, when in the docked position, the master device may be operable to control the display of the one or more screens on the plurality of display portions of the slave device display. The control of the display of the one or more screens in response to received gesture inputs on the plurality of display portions of the slave device display may be substantially the same as the control of the display of the one or more screens in response to the received gesture inputs on the plurality of master device displays. As such, the master device may include a master device gesture sensor adjacent to the plurality of master device displays, and the slave device may include a slave device gesture sensor adjacent to the slave device display.

In one embodiment, the slave device may include a retention mechanism for receivably engaging the master device in the docked position.

BRIEF DESCRIPTION OF THE DRAWINGS

FIG. 22 illustrates the display of desktop screens or a portrait and landscape orientation.

FIG. 27 illustrates an embodiment of a drawer operating on the slave device.

DETAILED DESCRIPTION

Figure 1:
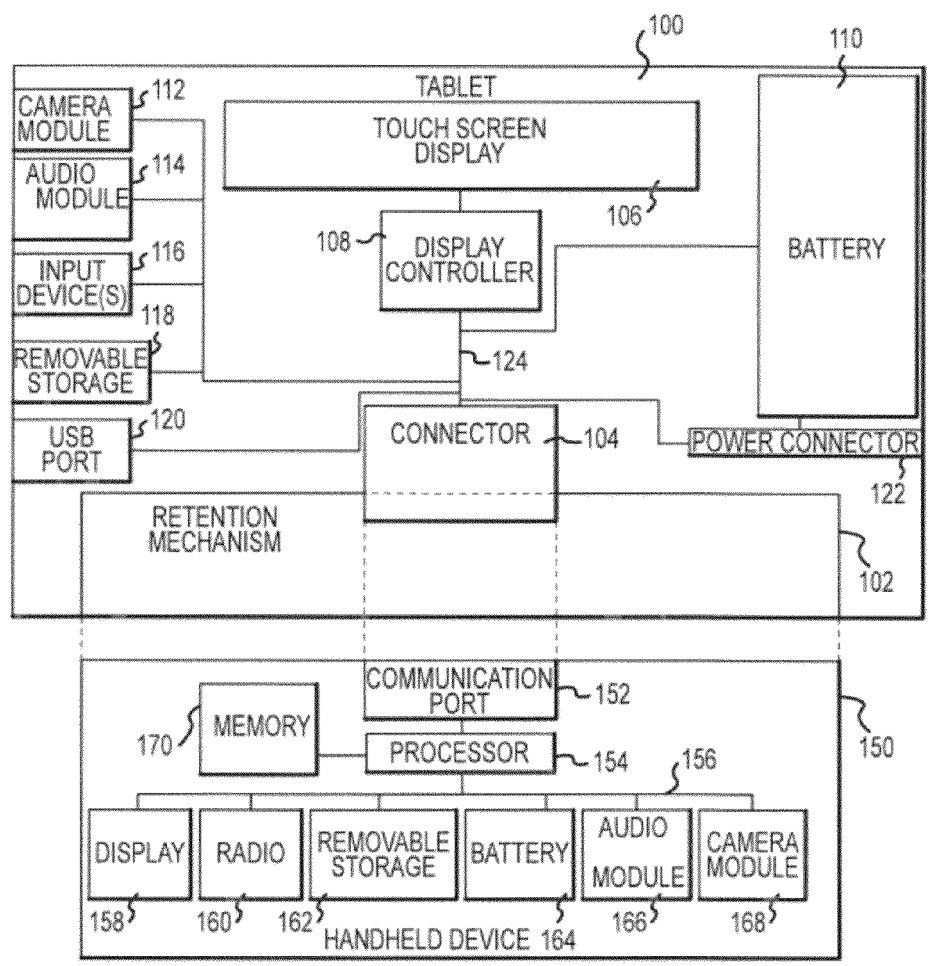
FIG. 1 is a schematic view of an embodiment of a system for docking portable electronic device.

The following description is not intended to limit the invention to the form disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

The following description relates, generally, to systems and methods of docking portable electronic devices. Specifically, the following description presents embodiments of implementations of user interfaces for a dockable master device and a slave device. For example, the user interfaces may be adaptable during and/or after the docking of the docking of the master device with the slave device so that the user interface displayed on the master device is adapted to be displayed on the slave device.

As described herein, a device may be referred to as a "slave device" or "master device". It is intended that a master device is operative for controlling at least some functionality of the slave device when docked therewith. The docking of the master and slave devices may allow the resources (e.g., processor(s), wireless radio(s), cellular radio(s), memory, etc.) of the master device to provide functionality to components of the slave device (e.g., input devices, display devices, audio and/or video devices, etc.). As such, a relatively simple and affordable slave device may be provided that lacks the resources of the master device. The slave device may take a form different than the form of the master device to provide functional versatility associated with a form other than that of the master device. Because the master device's resources provide the functionality to the slave device's components, the transition between using the master device and slave device may be seamless or "on the fly" and allow for all functionality and data resources of the master device to be utilized with the slave device without the need of complex and expensive synching capabilities such as cloud computing, server access, or time consuming physically synching operations.

A slave device may be provided that includes a retention mechanism for retaining a master device in a docked position with respect to the slave device. For example, the slave device may be a tablet device and the master device may be a handheld device (e.g., a smart phone). In this regard, a connector provided on the tablet may interface with a communication port of the handheld device when the handheld device is docked with the tablet. The connector may provide a communication interface between the handheld device and the tablet. The tablet may include hardware components that are integrated into the tablet device that may be controlled by the handheld device when the handheld device is in the docked position. For example, a touch screen display provided on the tablet device may display information from the handheld device and the handheld device may receive inputs from the touch screen display. As such, the user interface of the handheld device may be adapted to be displayed on the slave device once the master device has been docked therewith. Accordingly, as will be discussed in greater detail below, the advantages of both a tablet and handheld device may be realized.

FIG. 1 includes a schematic view of a slave device in the form of a tablet 100 and a master device in the form of a handheld device 150. It will be understood that these particular forms of master and slave devices are provided for illustrative purposes only and other forms of slave devices and master devices may be provided without limitation. For example, other forms of devices such as devices in the form of game pads, laptop computers, desktop computers, or work station terminals may be employed as either a slave or a master device.

The tablet device 150 may include a retention mechanism 102. The retention mechanism 102 may correspond to the handheld device 150 such that the handheld device 150 is retainably engaged by the retention mechanism 102 of the tablet 100. The master device 150 may be retained by the retention mechanism 102 such that at least a portion of the master device 150 is contained within the envelope of the slave device 100. When retainably engaged by the retention mechanism, the handheld device 150 may be in a docked position with respect to the tablet device 100.

The tablet 100 may also include a connector 104. As shown in FIG. 1, the connector 104 may be disposed relative to the retention mechanism 102 such that when the handheld device 150 is engaged with the retention mechanism 102, the connector 104 may interface with a communication port 152 of the handheld device 150. In this regard, the connector 104 may extend into a space provided on the tablet 100 into which the handheld device 150 is received when in the docked position.

The handheld device 150 may include a processor 154 in operative communication with the communication port 152. The processor 154 may be in further operative communication with various components of the handheld device 150. As such, the processor 154 may be operated to control operation of the various components of the handheld device 150. For example, the processor 154 may be in operative communication with a memory 170. The memory 170 may store executable code that is executable by the processor 154 to control the operation of the handheld device 150. For example, the memory 170 may contain code corresponding to an operating system executable by the processor 154 to control the handheld device 150.

Figure 2:
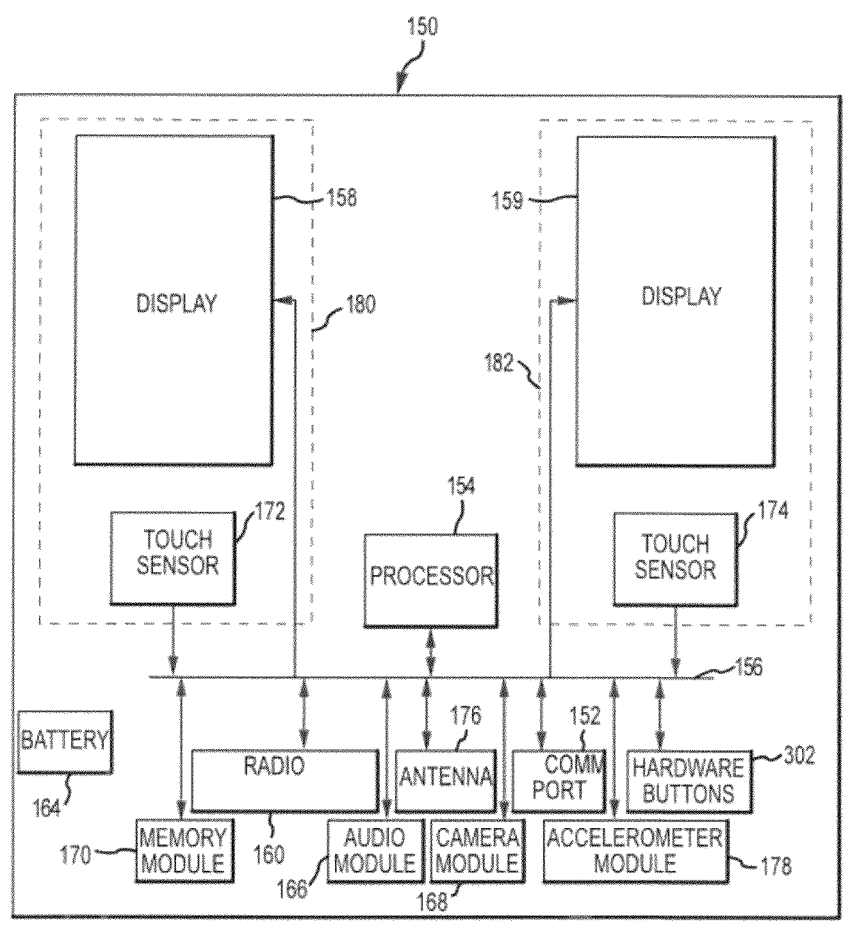
FIG. 2 is a schematic view of an embodiment of a handheld device.

FIG. 2 depicts in greater detail an embodiment of the handheld device 150. The handheld device 150 may include a first display 158 and a second display 159. Additionally, while two displays (158, 159) may be shown and described below with regard to the functionality of various embodiments of handheld devices, a handheld device may be provided that includes one or more displays. In any regard, the first display 158 and the second display 159 may be independently controllable. The displays may be operative to display a rendered image or screen. As used herein, the term "display" refers to device hardware, whereas "screen" refers to the displayed image rendered on the display. In this regard, a display is a physical hardware that is operable to render a screen. A screen may encompass a majority of the display. For instance, a screen may occupy substantially all of the display area except for areas dedicated to other functions (e.g., menu bars, status bars, etc.) Alternatively or additionally, a screen may occupy more than one display. A screen may be associated with an application and/or an operating system executing on the handheld device 150. For instance, application screens or desktop screens may be displayed. An application may have various kinds of screens that are capable of being manipulated as will be described further below. In an embodiment, each display of the handheld device 150 may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays, the screens displayed on the one or more displays, and various user input devices may comprise a GUI that allows a user to exploit functionality of the handheld computing device.

The handheld device 150 may be configurable between a first position and a second position. In the first position, a single display (e.g., the first display 158 or the second display 159) may be visible from the perspective of a user. Both displays 158 and 159 may be exposed on an exterior of the handheld device 150 when in the first position, but the displays 158 and 159 may be arranged in a non-adjacent manner such that both displays 158, 159 are not concurrently visible from the perspective of a user (e.g., one display may be visible from the front of the device 150 and the other display may be visible from the back of the device 150).

The handheld device 150 may also be provided in the second position such that the displays 158, 159 may be concurrently viewable from the perspective of a user (e.g., the displays 158, 159 may be positioned adjacent to one another). The displays 158, 159 may be displayed in the second position such that the displays 158, 159 are arranged end-to-end or side-by-side. Additionally, the displays 158, 159 may be arranged in a portrait orientation or a landscape orientation with respect to a user. As will be discussed further below, a portrait orientation is intended to describe an arrangement of a device, wherein the longer dimension of the display of the device is vertically oriented (e.g., with respect to gravity or the perspective of a user). A landscape orientation is intended to describe an arrangement wherein the shorter dimension of the display of the device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays or vice versa.

The handheld device 150 may be manipulated between the first position (e.g., a single display visible from a user's perspective) and the second position (e.g., at least two displays concurrently visible from the user's perspective) in a variety of manners. For instance, the device 150 may include a slider mechanism such that the first and second displays 158, 159 are disposable adjacent to one another in a parallel fashion in a second position and slideable to the first position where only a single display is viewable and the other display is obscured by the viewable display.

Alternatively, the device 150 may be arranged in a clam shell type arrangement wherein a hinge is provided between the first display 158 and the second display 159 such that the displays 158, 159 are concurrently visible by a user when in the second position (i.e., an open position). The displays 158, 159 may be provided on an interior clam shell portion or an exterior clam shell portion of the device 150. In this regard, both displays 158, 159 may be visible from the front and the back of the device, respectively, when the device is in the first position (i.e., the closed position). When the device 150 is in the open position, the displays 158, 159 may be provided adjacent and parallel to one another. Alternative arrangements of the handheld computing device 150 are contemplated wherein different arrangements and/or relative locations of the displays may be provided when in the first and second position.

While the foregoing has referenced two displays 158 and 159, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position.

The handheld device 150 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld device 150 may include at least a first touch sensor 172. Furthermore, the handheld computing device may include a second touch sensor 174. The first touch sensor 172 and/or the second touch sensor 174 may be touchpad devices, touch screen devices, or other appropriate touch sensitive devices. Examples include capacitive touch sensitive panels, resistive touch sensitive panels, or devices employing other touch sensitive technologies. The first touch sensor 172 and/or second touch sensor 174 may be used in conjunction with a portion of a user's body (e.g., finger, thumb, hand, etc.), a stylus, or other acceptable touch sensitive interface mechanisms known in the art. Furthermore, the first touch sensor 172 and/or the second touch sensor 174 may be multi-touch devices capable of sensing multiple touches simultaneously.

The first touch sensor 172 may correspond to the first display 158 and the second touch sensor 174 may correspond to the second display 159. In one embodiment of the handheld device 150, the first display 158 and the first touch sensor 172 comprise a first touch screen display 180. In this regard, the first touch sensor 172 may be transparent or translucent and positioned with respect to the first display 158 such that a corresponding touch received at the first touch sensor 172 may be correlated to the first display 158 (e.g., to interact with a screen rendered on the first display 158). Similarly, the second display 159 and the second touch sensor 174 may comprise a second touch screen display 182. In this regard, the second touch sensor 174 may be positioned with respect to the second display 159 such that a touch received at the second touch sensor 174 may be correlated to the second display 159 (e.g., to interact with a screen rendered on the second display 158). Alternatively, the first touch sensor 172 and/or the second touch sensor 174 may be provided separately from the displays 158, 159. Furthermore, in an alternate embodiment, only a single gesture sensor may be provided that allows for inputs to control both the first display 158 and the second display 159. The single gesture sensor may also be provided separately or integrally with the displays.

In this regard, the first and second touch sensors 172, 174 may have the substantially same footprint on the handheld device 150 as the displays 158, 159. Alternatively, the touch sensors 172, 174 may have a footprint including less of the entirety of the displays 158, 159. Further still, the touch sensors 172, 174 may include a footprint that extends beyond the displays 158, 159 such that at least a portion of the touch sensors 172, 174 are provided in non-overlapping relation with respect to the displays 158, 159. As discussed further below, the touch sensors 172, 174 may alternatively be provided in complete non-overlapping relation such that the footprint of the touch sensors 172, 174 is completely different than the footprint of the displays 158, 159.

A touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

As described above, the handheld device 150 may include a processor 154 that is in operative communication with a data bus 156. The processor 154 may generally be operative to control the functionality of the handheld device 150. For instance, the processor 154 may execute an operating system and be operative to execute applications. The processor 154 may be in communication with one or more additional components of the handheld computing device 150 as will be described below. For instance, the processor 154 may be in direct communication with one more of the additional components or may communicate with the one or more additional components via the data bus 156. Furthermore, while the discussion below may describe the additional components being in operative communication with the data bus 156, in other embodiments any of the additional components may be in direct operative communication with any of the other additional components. Furthermore, the processor 154 may be operative to independently control the first display 158 and the second display 159 and may be operative to receive input from the first touch sensor 172 and the second touch sensor 174. The processor 154 may comprise one or more different processors. For example, the processor 154 may comprise one or more application specific integrated circuits (ASICs), one or more field-programmable gate arrays (FPGAs), one or more general purpose processors operative to execute machine readable code, or a combination of the foregoing.

The handheld computing device may include a battery 164 operative to provide power to the various devices and components of the handheld device 150. In this regard, the handheld computing device 150 may be portable.

Additionally, the handheld device 150 may include one or more radios 160. For example, the one or more radios may include a Wi-Fi radio employing, for instance, an IEEE 802.11 standard; a cellular radio employing, for instance, GSM, CDMA, LTE, or WiMAX; a Bluetooth radio; or other appropriate wireless radio. The handheld computing device 100 may also include an antenna 176. The antenna 176 may be in operative communication with the one or more radios 160 to provide wireless capability to the handheld device 150. Accordingly, the handheld device 150 may have telephony capability (i.e., the handheld computing device 150 may be a smart phone device).

With reference to FIG. 1, the handheld device 150 may also include removable storage 162 such as, for example, a Secure Digital (SD) card slot or the like.

An audio module 166 may also be provided in operative communication with the data bus 156. The audio module 166 may include a microphone and/or speakers. In this regard, the audio module 166 may be able to capture audio or produce sounds. Furthermore, the device 150 may include a camera module 168. The camera module 168 may be in operative communication with other components of the handheld device 150 to facilitate the capture and storage of images or video.

The handheld device 150 may further include an accelerometer module 178. The accelerometer module 178 may be able to monitor the orientation of the handheld device 150 with respect to gravity. In this regard, the accelerometer module 178 may be operable to determine whether the handheld device 150 is substantially in a portrait orientation or landscape orientation. The accelerometer module 178 may further provide other control functionality by monitoring the orientation and/or movement of the handheld device 150.

The handheld device 150 may also include one or more hardware buttons 134. The hardware buttons 302 may be used to control various features of the handheld device 150. The hardware buttons 134 may have fixed functionality or may be contextual such that the specific function of the buttons changes during operation of the handheld device 150. Examples of such hardware buttons may include, but are not limited to, a volume control, a home screen button, an end button, a send button, a menu button, etc.

Returning to FIG. 1, the connector 104 of the tablet 100 may also be in operative communication with various components of the tablet 100. For example, the tablet 100 may have components that are redundant with those provided on the handheld device (e.g., a camera module 112, module 114, removable storage 118, a touch screen display 106, a battery 110) or may have unique components not shared by the handheld device (e.g., a USB port 120, etc.). Additionally, the tablet 100 may include a power connector 122 that may be operative to charge the battery 110 of the tablet or the battery 164 of the handheld device 150 when docked with the tablet 100.

When the handheld device 150 is provided in the docked position, the interface of the communication port 152 and the connector 104 may establish operative communication between the processor 154 and a communications bus 124 provided in the tablet 100. The various components of the tablet 100 may also be in operative communication with the communication bus 124 such that the processor 154 is in operative communication with the various components of the tablet 100 when in the docked position. The communication between the processor 154 and the various components of the tablet 100 may allow for the processor 154 to control the operation of the various components of the tablet 100.

The tablet 100 may be considered a "dumb" device. That is, the tablet 100 may lack the resources to exploit the full functionality of the components of the tablet 100. Of note, the tablet 100 may lack a processor operative to provide full functionality of the various components of the tablet 100. Furthermore, the tablet 100 may lack a radio. In this regard, the tablet 100 may rely on the processor 154 and radio 160 of the handheld device 150 in order to provide full functionality of the components of the tablet 100. For instance, the tablet 100 may require communication with the master device 150 for sufficient processing power to exploit the components of the tablet 100 or to facilitate wireless communication. However, the tablet 100 may provide some rudimentary functionality without the assistance of the master device 150. For example, the touch screen display 106 may be in communication with a display controller 108 that allows the touch screen display 106 to be used for simple tasks (e.g., displaying tablet 100 status information including battery levels, whether a master device 150 is docked, etc.). However, the functionality of the display controller 108 may be limited to certain predefined functionality.

Additionally, the interface defined between the connector 104 and the communications port 152 may include a power interface. As such, power may be supplied from the tablet (e.g., from the battery 110 or power connector 122) to the handheld device 150. Furthermore, power may pass from the handheld device 150 (e.g., the battery 164) to the tablet 100. Thus, the power interface may be established to provide power from the tablet to the handheld device or from the handheld device to the tablet.

Figure 3:
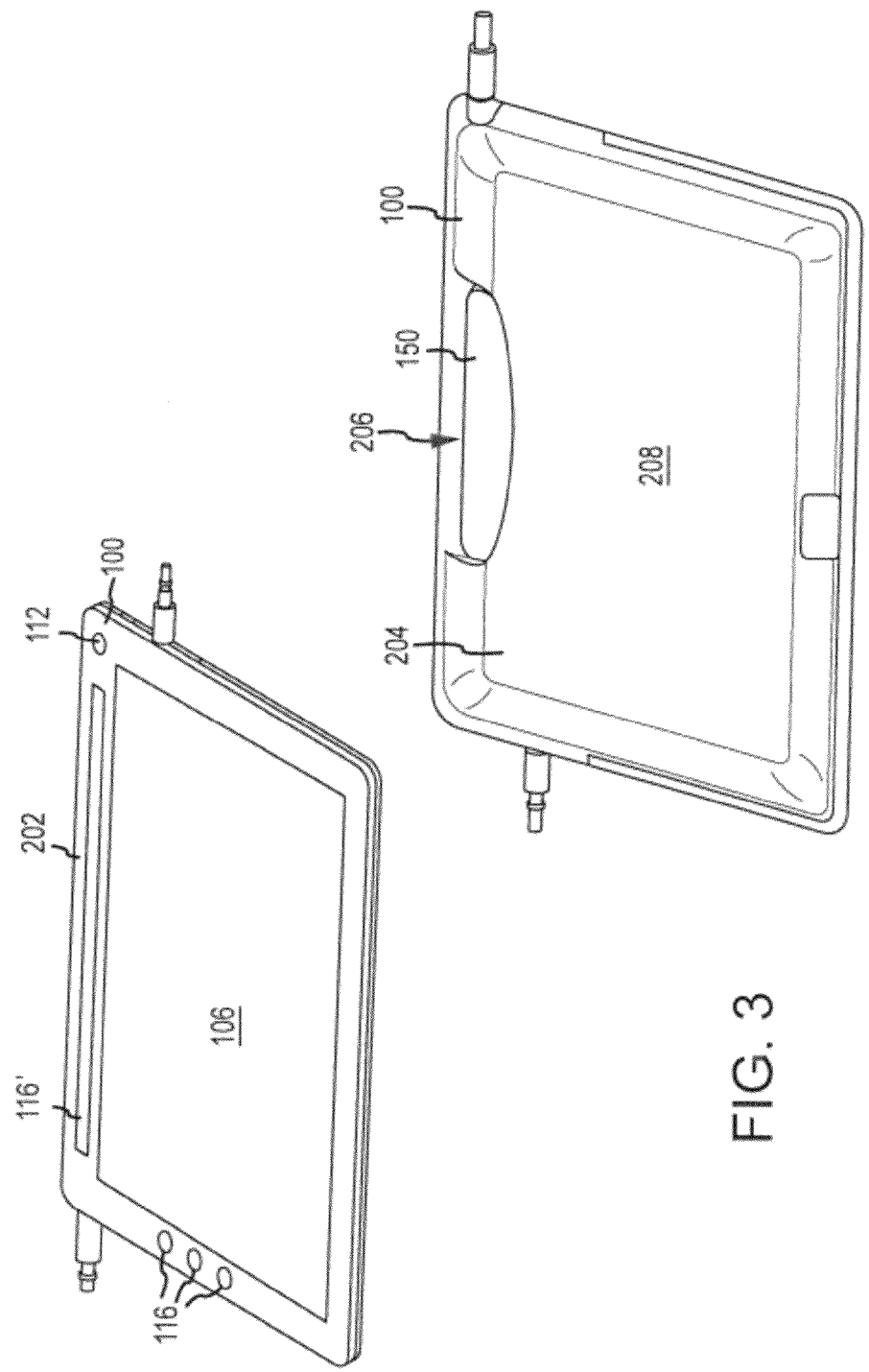
FIG. 3 illustrates an embodiment of a tablet device and a handheld device in docked position.

With additional reference to FIG. 3, one embodiment of a tablet 100 with a handheld device 150 provided in a docked position with respect to the tablet 100 is shown. FIG. 3 includes front and back perspective views of the tablet 100. As can be appreciated from FIG. 3, the tablet 100 may include a front side 202 and a back side 204. The front side 202 may include the touch screen display 106. Furthermore, the front side 202 may include a number of input devices 116 and 116'. For example, a number of buttons or touch sensitive areas may be provided with which a user may interact. The touch sensitive area 116' shown in FIG. 3 may have the same characteristics or relationship with the display 106 as that described above with regard to the touch sensors 172, 174 with respect to the displays 158, 159. For example, the touch sensitive area 116' may comprise a portion of one or both of the touch sensors 172, 174 extending beyond the area of the display 106. The camera module 112 of the tablet 100 may be disposed on the front side 202 of the tablet 100. While not shown, additional camera modules may be provided (e.g., a rear facing camera module on the back side 204 of the tablet 100).

The back side 204 may include an aperture 206 through which the handheld device 150 may be disposed. A retention mechanism 102 (not shown in FIG. 2) may be provided to retainably engage the handheld device 150 such that the handheld device 150 is retained in the aperture 206. In this regard, a portion of the handheld device 150 may be covered by a back panel 208 of the tablet 100 when the handheld device 150 is in the docked position. That is, a portion of the handheld device 150 may be contained within the envelope of the tablet 100. In one embodiment, substantially all of the handheld device 150 may be contained within the envelope of the tablet 100. The envelope of the tablet 100 may correspond with the greatest exterior dimension of the tablet. Accordingly, "contained within the envelope of the tablet" may mean that the handheld device 100 does not extend the overall exterior dimensions of the tablet 100.

Figure 4:
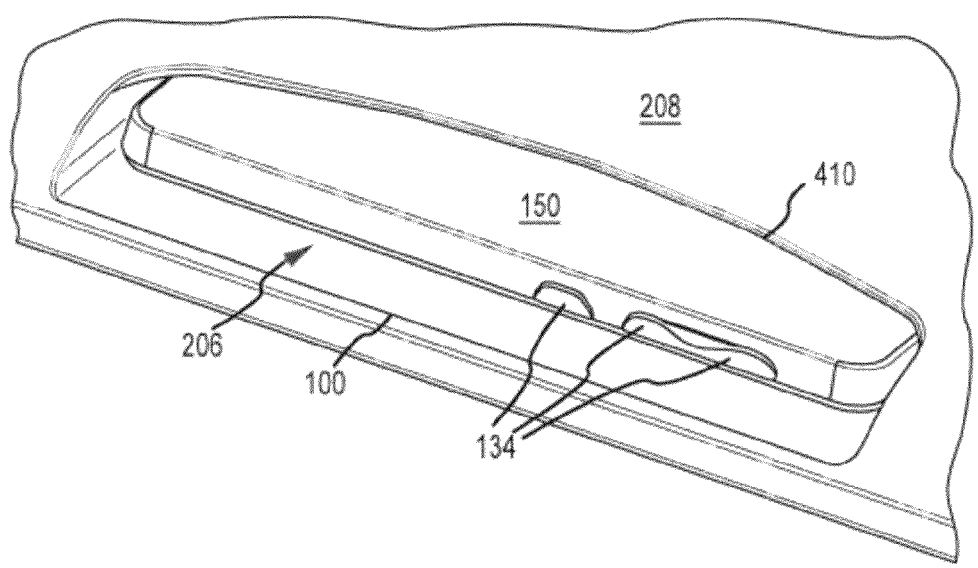
FIG. 4 illustrates a detailed view of the embodiment of FIG. 3.

FIG. 4 depicts a detailed view of the handheld device 150 in a docked position with respect to the tablet 100. The back panel 208 may be contoured to accommodate receipt of the handheld device 150 into the aperture 206. A portion of the handheld device 150 may still be accessible from an exterior of the tablet 100. For example, as shown in FIG. 4, physical input devices 134 (e.g., buttons such as volume or power buttons) of the handheld device 150 may be accessible from the exterior of the tablet 100. In this regard, the physical input devices 134 may be used when the handheld device 150 is in the docked position. Accordingly, the need to provide redundant physical input devices 302 on the tablet 100 may be eliminated.

The handheld device 150 may be responsive to gesture inputs received at the handheld device 150 or the tablet 100 for interaction with a computing device. The interface controls of the handheld device 150 particularly suited for control of one or more displays capable of displaying graphical user interfaces (GUIs). In this regard, the handheld device 150 may include more than one display capable of presenting a GUI.

With further reference to FIGS. 5A-D, various screens of an embodiment of a device are shown. While multiple screens may be shown, only one or a subset of the multiple screens may be shown on a device at any one moment. In this regard, a screen may be described in a relative location to the displays or other screens (e.g., to the left of a display or screen, to the right of a display or screen, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 5A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 5A:
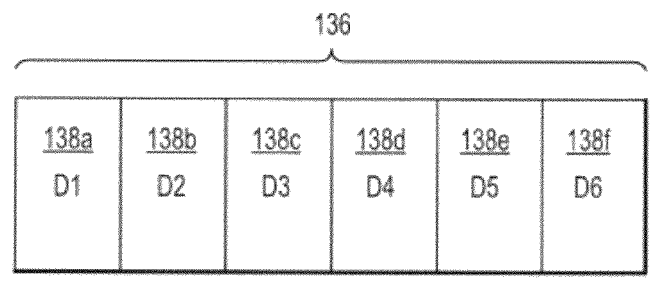
FIG. 5A-5D illustrates embodiments of screens displayable on a display.

A desktop sequence 136 is displayed in FIG. 5A. The desktop sequence 136 may include a number of individual desktop screens 138a-138f. Thus, each desktop screen 138 may occupy substantially the entirety of a single display (e.g., the first display 158 or second display 159). The desktop screens 138a-138f may be in a predetermined order such that the desktop screens 138a-138f appear consecutively and the order in which the desktop screens appear may not be reordered. However, the desktop screens 138a-138f may be sequentially navigated (e.g., in response to a user input). That is, one or more of the desktop screens 138a-138f may be sequentially displayed on a handheld device as controlled by a user input.

Figure 5B:
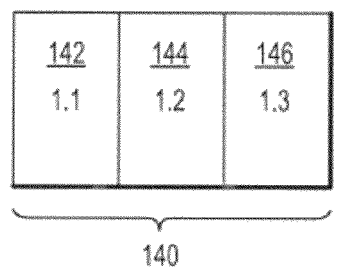
Figure 5C:
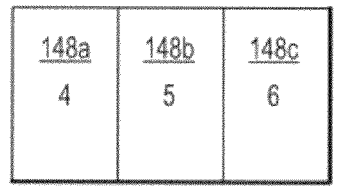

Additionally, FIG. 5B displays a hierarchical application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen 144 for which the leaf screen 146 is a parent. As such, the leaf screen does not have any children node screens 144. FIG. 5C depicts various single screen applications 148a, 148b, and 148c arranged sequentially. Each of these single screen applications may correspond to a different executing application. For instance, in FIG. 5C Application 4, Application 5, and Application 6 may be executing on the device and correspond to each single screen 148a, 148b, and 148c, respectively.

Figure 5D:

FIG. 5D also includes an empty view 165. The empty view 165 may be used during transitions of a screen (e.g., movement of screen between a first display and a second display). It is not necessary that the empty view 165 be interpretable by the user as an effective GUI screen. The empty view 165 merely communicates to the user that an action regarding the screen (e.g., the movement of the screen with respect to one or more displays) is occurring. An application displaying an empty view 165 need not be able to rest, wait, process or interpret input. The empty view 165 may display a screen, or a representation thereof, as it is being moved in proportion to the amount of the screen that has been moved from a first display to a second display as will be discussed in greater detail below. In this regard, the empty view 165 may be used to relate information regarding the position of a screen during a transition of the screen (e.g., in response to gesture). An empty view 165 is only intended to refer to a screen not capable of receiving an input (e.g., a screen in transition). In this regard, the display of an empty view 165 may include an animation or the like showing the response of a screen as it is being moved or changed (e.g., modified into or out of a landscape mode).

Figure 6A:
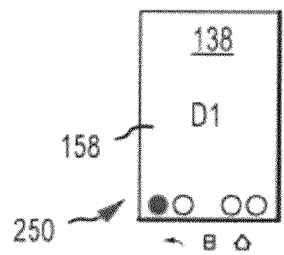
FIGS. 6A-6K illustrate various embodiments of arrangements and orientations of a master device.
Figure 6B:
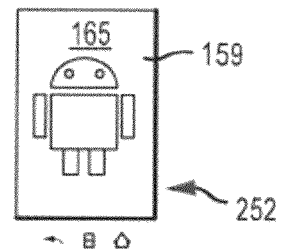
Figure 6C:
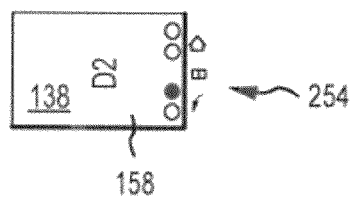
Figure 6D:
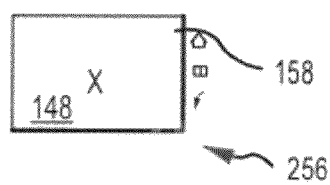
Figure 6E:
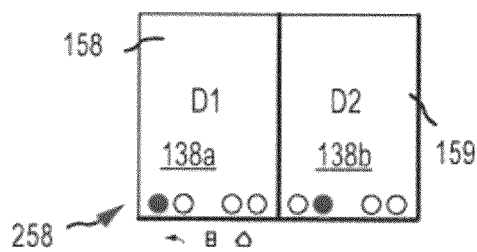
Figure 6F:
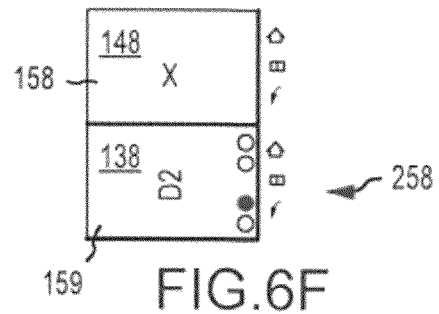
Figure 6G:
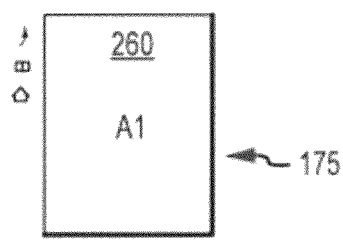
Figure 6H:
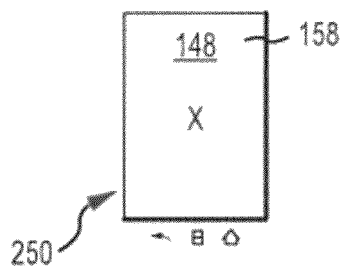

FIGS. 6A-K depict various arrangements and statuses of displays 158, 159 of a device that are possible in various embodiments of a handheld computing device according to the present disclosure. For instance, when in the first (e.g., closed) position, a closed front display 250 may be visible as shown in FIG. 6A. The closed front display 250 may correspond with the first display 158 or the second display 159. The closed front 250 as displayed may be occupied by a desktop screen D1 138 as shown in FIG. 6A. Alternatively, an application with a single screen or a multi screen application in single screen mode may be displayed in the closed front 250. A closed back display 252 may be viewable from an opposite side of the front display 250 when the device is in a closed position, as shown in FIG. 6B. The closed back 252 may display a different desktop screen or application screen than the closed front 250 (e.g., as shown in FIG. 6H) or may simply display an empty view 165 (e.g., displaying an icon or other graphic) and lack functionality as an interface.

FIG. 6C depicts a closed device in a landscape orientation 254. In one embodiment, a landscape mode (i.e., wherein the display is adjusted to display a screen in a landscape orientation) may not be enabled as shown in FIG. 6C. Alternatively, the landscape mode may be enabled such that the screen (e.g., application screen 148) is modified when the device is sensed in a landscape orientation 256, such that the screen 148 is rendered in a landscape orientation as shown at FIG. 6D.

The device may further be provided in a second (e.g., open) position 258 as shown in FIG. 6E. In the open position 258, at least two displays 158, 159 are arranged such that the two displays 158, 159 are both visible from the vantage point of a user. The two displays 158, 159 may be arranged in a side-by-side fashion when in the open position 258. Thus, each of the two displays 158, 159 may display separate screens. For instance, the displays 158, 159 may each display a separate desktop screen 138a, 138b, respectively. While the individual displays 158 and 159 are in a portrait orientation as shown in FIG. 6E, it may be appreciated that the full display area (comprising both the first display 158 and the second display 159) may be arranged in a landscape orientation. Thus, whether the device as depicted in FIG. 6E is in a landscape or portrait orientation may depend on whether the displays are being used individually or collectively. If used collectively as a unitary display, the device may be in a landscape orientation, whereas if the displays are used separately, the orientation shown in FIG. 6E may be referred to as a portrait orientation. The handheld device 150 may be in the open position 158 when docked with the tablet 100.

Additionally, when the device is in an open position 258 as shown in FIG. 6F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 6F, a single screen 148 may occupy a first display 158 and the second display 159 may display a desktop screen 138. The single screen 148 may be displayed in a landscape or portrait mode. Alternatively, a device in an open orientation may display a multi screen application 260 that may occupy both displays 158, 159 in a portrait orientation as shown in FIG. 6G such that the individual displays are in a landscape orientation.

Figure 6I:
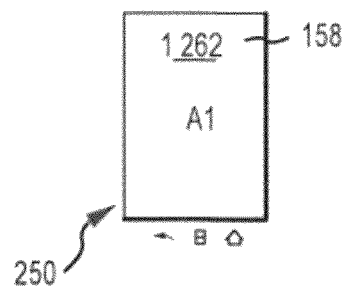
Figure 6J:
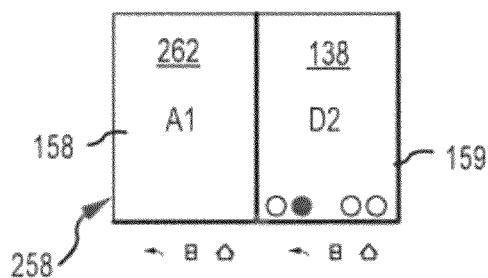
Figure 6K:
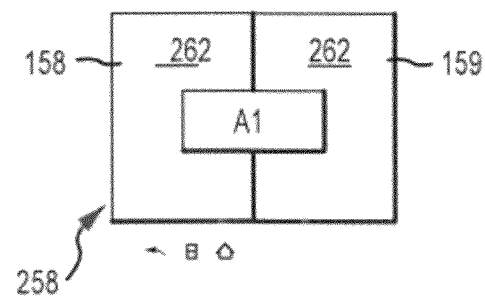

FIGS. 6I-K depict the potential arrangements of the screens of a multi screen application 262. The multi screen application 262 may, in one mode, occupy a single display 158 when the device is in a closed position 250 as shown in FIG. 3I. That is, the multi screen application 262 may be in a single screen mode. Alternatively, when the device is in an open position 258 as shown in FIG. 6J, the multi screen application 262 may still occupy a single display 158 in single screen mode. Furthermore, the multi screen application 262 may be expanded to occupy both displays 158, 159 when the device is in the open position as shown in FIG. 6K. In this regard, the multi screen application 262 may also execute in a multi screen mode. Various options may be provided for expanding the multi screen application 262 from a single screen mode to a multi screen mode.

For example, the multi screen application 262 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 5B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 7:
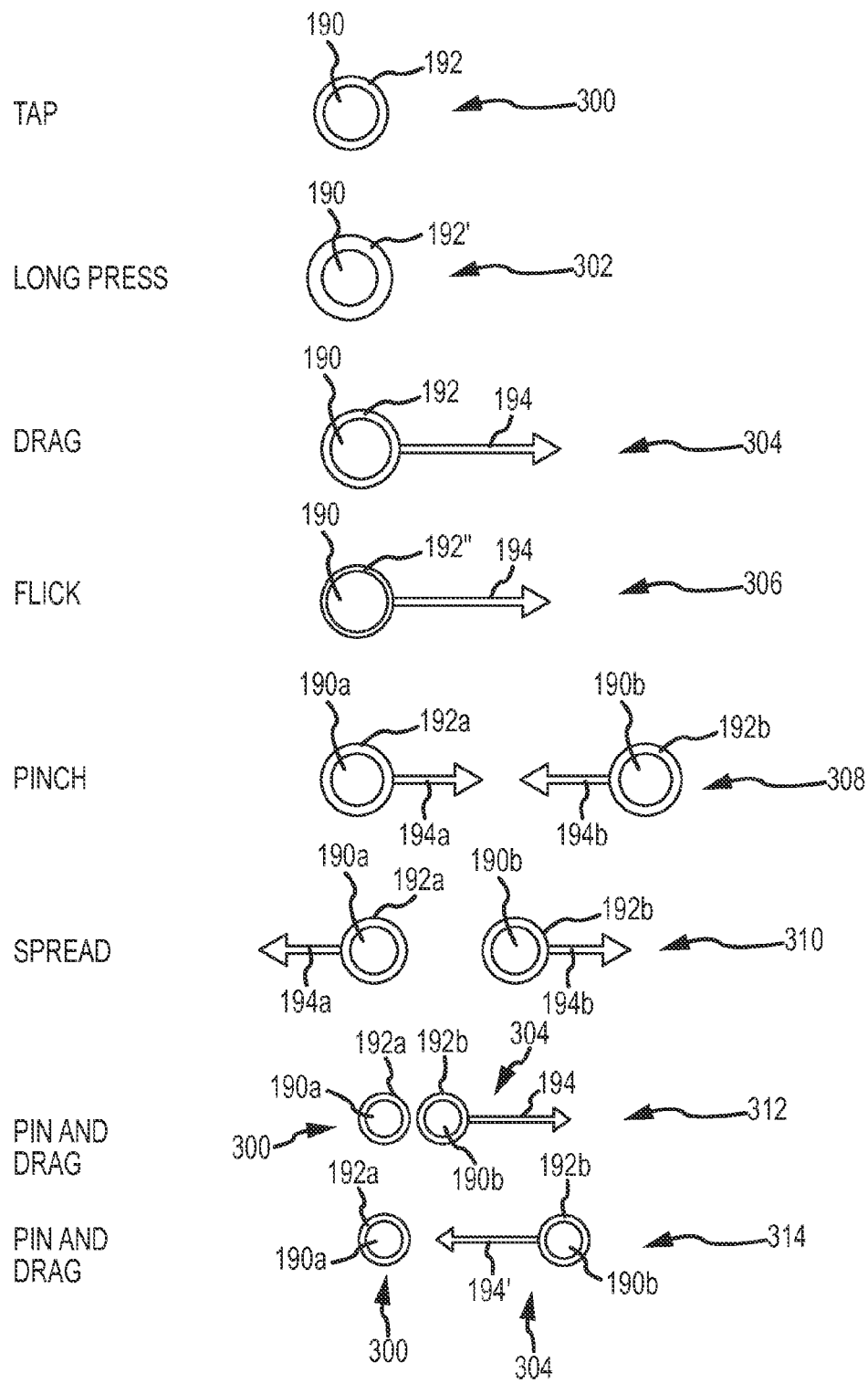
FIG. 7 illustrates various embodiments of gesture inputs.

FIG. 7 depicts various graphical representations of gesture inputs that may be recognized by a handheld computing device. The gestures shown are demonstrative, and as such, other gestures may be provided without limitation. Such gestures may be received at one or more gesture sensors of the device or other gesture sensor as described above. In this regard, various input mechanisms may be used in order to generate the gestures shown in FIG. 7. For example a stylus, a user's finger(s), or other devices may be used to activate a gesture sensor in order to receive the gestures. Alternatively, the gestures may be detected by an optical device (e.g., a camera). The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single gesture sensor. The use of gesture inputs is particularly suited to handheld computing devices in that the full action of an input may be difficult to execute given the limited input and display space commonly provided on a handheld computing device.

With reference to FIG. 7, a circle 190 may represent an input received at a gesture sensor. The circle 190 may include a border 192, the thickness of which may indicate the length of time the input is held stationary. In this regard, a tap 300 has a thinner border 192 than the border 192' for a long press 302. In this regard, the long press 302 may involve an input that remains stationary for longer than that of a tap 300. As such, different gestures may be registered depending upon the length of time that the gesture remains stationary prior to movement.

A drag 304 involves an input (represented by circle 190) with movement 194 in a direction. The drag 304 may involve an initiating gesture (e.g., a tap 300 or long press 302) that remains stationary with respect to the gesture sensor for a certain amount of time represented by the border 192. In contrast, a flick 306 may involve an input with a shorter dwell time prior to movement than the drag 304 as indicated by the thinner border 192" of the initiation of the flick 306. The flick 306 may also include movement 194. The direction of movement 194 of the drag 304 and flick 306 may be referred to as the direction of the drag 304 or direction of the flick 306.

In an embodiment, a gesture having movement (e.g., a flick 306 or drag 604 as described above) may be limited to movement in a single direction along a single axis (e.g., a horizontal, vertical, or other axis). Thus, movement in a direction different than along the first axis may be disregarded during the execution of the gesture. In this regard, once a gesture is initiated, movement in a direction not along an axis along which initial movement is registered may be disregarded or only the vector component of movement along the axis may be registered.

With additional reference to FIG. 7, a pinch gesture 308 and a spread gesture 310 may be provided. The pinch gesture 308 may include a pair of drag gestures 190a and 190b, wherein the directions 194a and 194b from the original contact locations 190a and 190b are in a direction toward each other. This may be a multi touch gesture requiring, for example, a user to employ two fingers to accomplish. Additionally, a spread gesture 310 may be provided. In the spread gesture 310, the original touches 190a and 190b may, after the initial touches, have movement in the direction 194a and 194b in generally opposite directions. Furthermore, a pin and drag gesture 312 and 314 may be provided in either the right or left direction.

Figure 8:
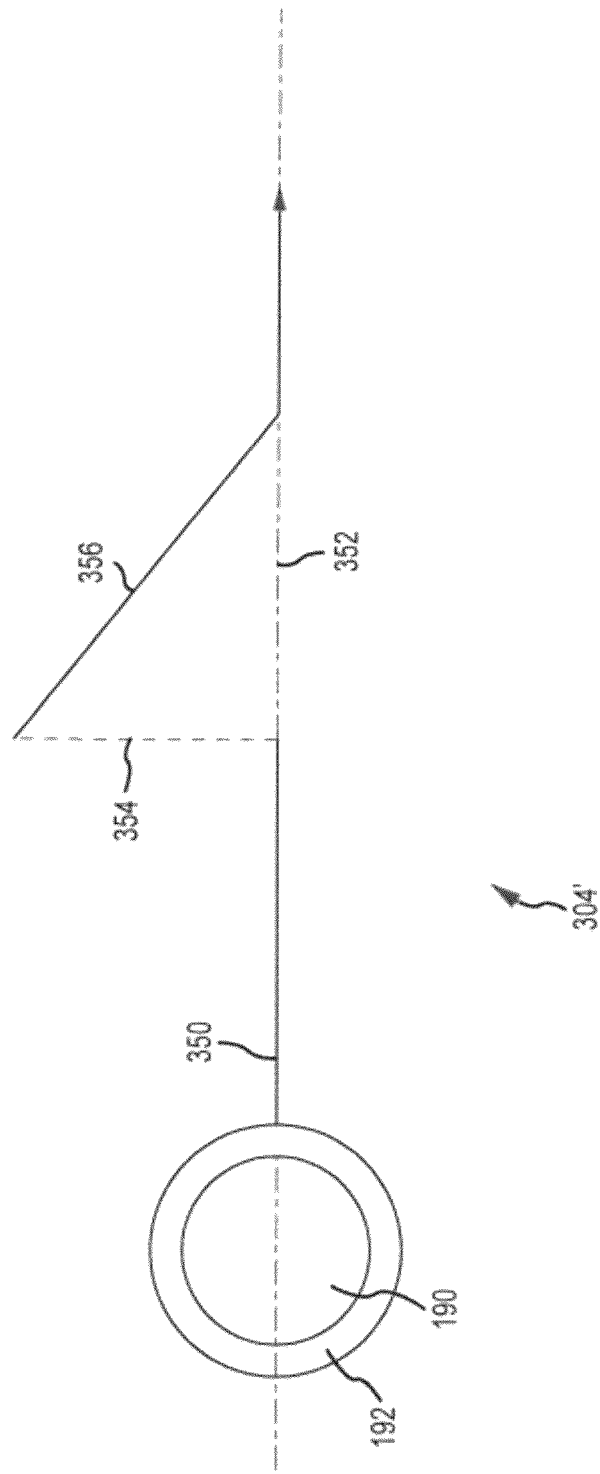
FIG. 8 illustrates potential gesture inputs.

While the gestures shown in FIG. 7 include only horizontal motion after the initial input, this may not be actual movement by the user when entering the gesture. For instance, once a drag 304 is initiated in the horizontal direction, movement in a direction other than in the horizontal direction may not result in movement of the screen to be moved in the direction different than the horizontal direction. For instance, with further reference to FIG. 8, the drag 304' from left to right may be initiated with initial movement 350 from left to right along an initiated direction 352. Subsequently, the user may input an off direction movement 354 in a direction different than the initiated direction 350. In this regard, the off direction movement 354 may not result in any movement of a screen between two displays. Furthermore, the user may input partially off direction movement 356, where only a vector portion of the movement is in the direction of the initiated direction 352. In this regard, only the portion of the partially off direction movement 356 may result in movement of a screen between displays. In short, the movement of application screens between the first display 158 and the second display 159 may be constrained along a single axis along which the displays are arranged.

As briefly discussed above, multiple simultaneous gesture portions may be received at the same time (e.g., by a multi-touch device, or other gesture sensor). A gesture input that combines multiple individual gesture portions may be considered a unique gesture input and have unique functionality associated therewith. For example, a first pin and drag gesture 310 may comprise a first portion including a tap 300 as well as a second portion including a drag gesture 304. The drag gesture 304 may be generally away from the tap 300 such that the direction of the drag gesture 304 is away from the tap gesture 300. Alternatively, a second pin and drag gesture 314 is also shown where the tap 300 may be received and a drag gesture 304 may originate away from the tap 300 and be in a direction towards the tap 300. The first and second portions of a multi portion gesture may have different targets such that the two portions affect different results with respect to an interface.

Figure 9:
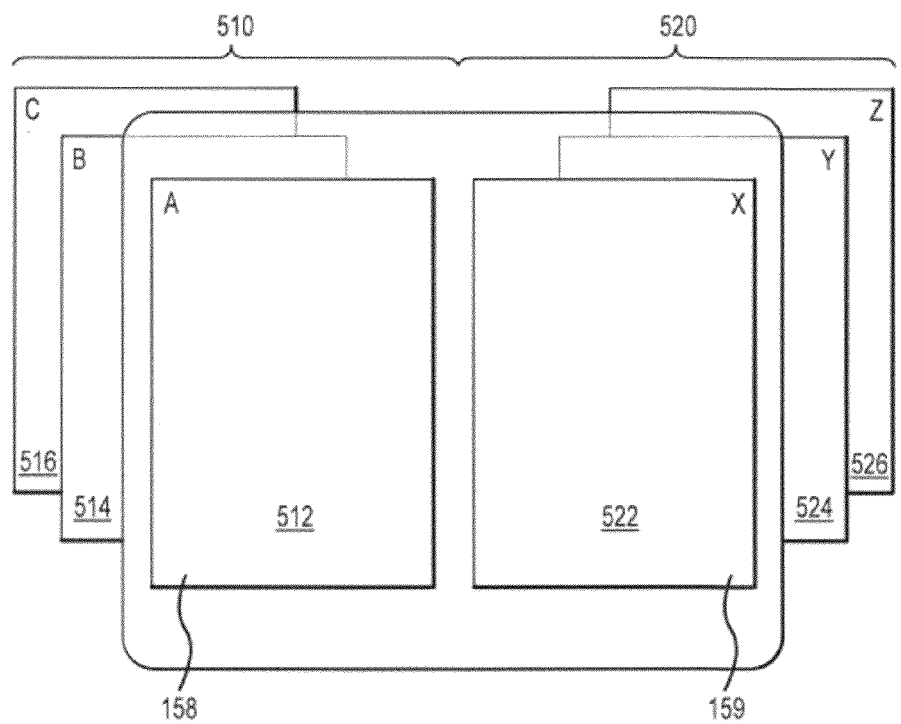
FIG. 9 illustrates an embodiment of a user interface including application stacks demonstrating the logical position of screens in the application stack.

Screens may be logically associated with a display and be logically arranged with respect to one another even though not all screens are physically rendered on a display. With additional reference to FIG. 9, this concept is further graphically represented. In FIG. 9, a first display 158 actively displays a first application screen (screen A 512). While the present discussion references the first display 158 and second display 159 of the master device 150, FIG. 9 is equally as applicable to portions of the slave device display 106. Additionally, a first application stack 510 is depicted. An application stack may be operative to maintain logical associations of a screen with a respective display. As referenced below, this logical association may be referred to as the position of the application with respect to a display. In this regard, when referring to an application "positioned in a display," it is meant the application is logically associated with the display as the application may not be actively displayed.

In addition, an application stack may logically maintain the relative positions of screens with respect to one another (i.e., the order of the screens in the application stack). In this regard, a screen may be logically disposed in an application stack associated with a display even though the screen may not be physically rendered on the display. A display controller or other control device (e.g., a processor, memory, or an operative combination thereof) may be operative to maintain the logical associations of screens. This may involve storing the logical association of the screen with a display and/or other screens in memory. As such, the logical associations of the screen with a display and with other screens may be logically maintained and/or changed even though the screen is not actively displayed.

For example, the first application stack 510 is comprised of screen A 512, screen B 514, and screen C 516 which are all logically associated with the first display 158. As shown, only screen A 512 from the application stack 510 is physically displayed. Screen B 514 and screen C 516 may belong to the first application stack 510 associated with the first display 158 and be logically positioned behind screen A 510 in the manner shown in FIG. 9. As such, screen B 514 and screen C 516 may be logically positioned behind screen A 512 such that screen B 514 and screen C 516 are not actively rendered on the first display 158. While each application belonging to the first application stack 510 is logically associated with the first display, applications that are not currently rendered in the display may suspend or close when not actively displayed. Alternatively, applications may continue to execute in the background, even though not displayed. Regardless, the non-displayed applications may continue to reside in the application stack 510 until otherwise closed or ended by a user.

A second application stack 520 may also be provided to maintain the logical associations of screens with respect to a second display 159. The second application stack 520 is comprised of screen X 522, screen Y 524, and screen Z 526 and may behave in a manner similar to the first application stack 510 described above. Each of screen A 512, screen B 514, screen C 516, screen X 522, screen Y 524, and screen Z 526 may correspond to individual applications. As shown, screen X 522 is currently displayed. While screen Y 524 and screen Z 526 are logically associated with the second display 159 and are logically positioned behind screen X 522 as shown in FIG. 9. Thus, while each application in the second application stack 520 is disposed in the second display 159, only one application may be actively rendered on the display.

The arrangement (i.e., logical associations) of the screens with respect to the displays and within the application stacks 510, 520 may be arrived at by various methods including manipulation of screens via drag gestures, opening a new application on top of an existing screen rendered on a display, or other means of manipulation whereby screens are moved between the first display 158 and the second display 159.

In light of the foregoing, wherein applications may reside in application stacks associated with a display such that non-displayed applications remain in the application stack, it may be desirable or advantageous to allow for the manipulation of applications between displays such that applications may be moved from a first application stack to a second application stack by a user. The movement of applications between application stacks may, for instance, be accomplished by way of gesture inputs.

A number of applications related to gesture based control of screens on a display and application management on multi-display devices have been proposed by the present assignee. For example, these applications include U.S. patent application Ser. No. 12/948,667 entitled "GESTURE CONTROLS FOR MULTI-SCREEN USER INTERFACE" filed Nov. 17, 2010, U.S. patent application Ser. No. 12/948,675 entitled "GESTURE CONTROLLED SCREEN REPOSITIONING FOR ONE OR MORE DISPLAYS" filed Nov. 17, 2010, U.S. patent application Ser. No. 12/948,676 entitled "GESTURE CONTROLS FOR MULTI-SCREEN HIERARCHICAL APPLICATIONS" filed Nov. 17, 2010, U.S. application Ser. No. 12/948,682 entitled "MULTI-SCREEN USER INTERFACE WITH ORIENTATION BASED CONTROL" filed Nov. 17, 2010, U.S. application Ser. No. 12/948,684 entitled "GESTURE BASED APPLICATION MANAGEMENT" filed Nov. 17, 2010, U.S. patent application Ser. No. 12/948,686 entitled "USER INTERFACE WITH SCREEN SPANNING ICON MORPHING" filed Nov. 17, 2010, U.S. patent application Ser. No. 12/948,699 entitled "USER INTERFACE WITH STACKED APPLICATION MANAGEMENT" filed Nov. 17, 2010, and U.S. patent application Ser. No. 12/948,701 entitled "USER INTERFACE WITH INDEPENDENT DRAWER CONTROL" filed Nov. 17, 2010, the entirety of each and every one of the foregoing being incorporated herein by reference.

While the foregoing discussion has referenced the control and management of screens as displayed on a plurality of distinct display devices, it will be understood that the user interface discussed above may be adapted to be used with a slave device having a different number of displays as the master device docked therewith. In this regard, screens previously discussed as being displayed on a distinct display may be adapted to be rendered on a portion of a display (e.g., a portion of a unitary display of the slave device). Accordingly, the foregoing discussion regarding the potential layouts and movement of screens with respect to displays of the master device may be equally applicable to the movement of screens with respect to portions of a display of the slave device. For example, the display of the slave device may be divided into a corresponding number of portions as the number of displays of the master device. As such, screens displayed on a given display of the master device may be displayed on a corresponding portion of the display of the slave device once the master device is docked with the slave device.

Figure 10:
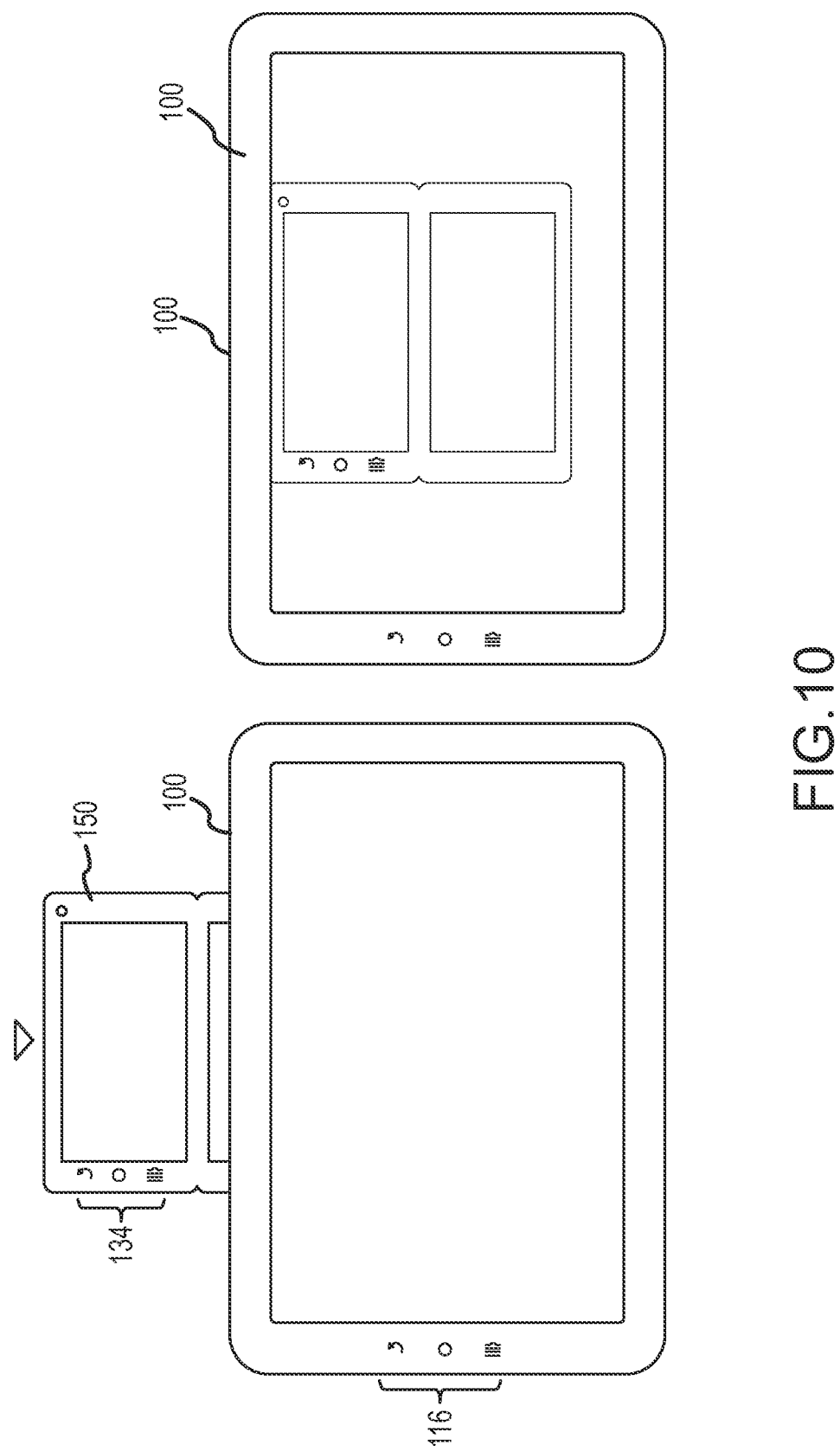
FIG. 10 illustrates one embodiment of docking of a master device with a slave device.

Continuing with the example described above involving a master device in the form of a handheld device having two touch screen displays and a slave device in the form of a tablet, the master device 150 may be docked with the tablet 100 as shown in FIG. 10. As can be appreciated from FIG. 10, the handheld device 150 may include a number of input devices (e.g., hardware buttons 134). The tablet 100 may have corresponding input devices 116. With additional reference to FIG. 11, the handheld device 150 may be docked with the tablet 100 such that applications 148A and 148B displayed on the first display 158 and second display 159, respectively, are subsequently displayed in a first portion 106A and second portion 106B of the display 106 of the tablet 100 after docking. In this regard, the first application 148A and second application 148B may be single or multi screen applications executing in single screen mode. As such, once the handheld device 150 is docked with the tablet 100, the applications 148A and 148B may remain in single screen mode and be displayed in respective portions of the display 106.

Figure 11:
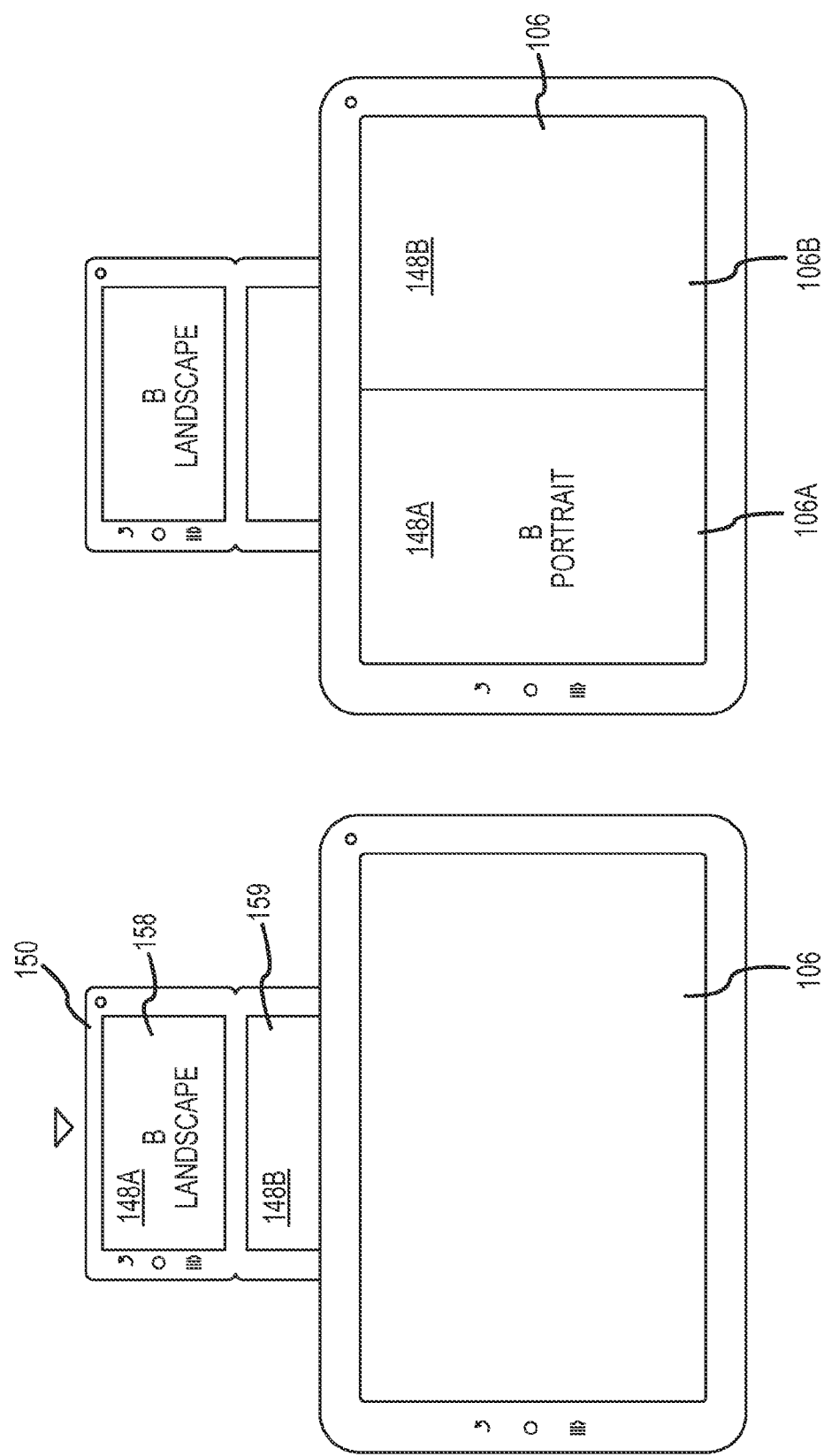
FIG. 11 illustrates one example of adapting screens from the master device for display on the slave device.

It will be appreciated from FIG. 11 that the handheld device 150 may be in the second position (e.g., the open position such that both displays 158 and 159 are visible from a single side of the handheld device 150). Furthermore, it will be appreciated that the docked position of the handheld device 150 may be such that the displays 158 and 159 are in a different orientation than the corresponding portions of the display 106. That is, when docked the displays 158 and 159 of the handheld device 150 may be in the landscape orientation, while the corresponding portions 106A and 106B of the tablet 100 may be in the portrait orientation. Thus, the applications 148A and 148B may be modified to be displayed in the portrait orientation once the handheld device 150 is docked. It will be appreciated that this may not be the case. That is, the orientation of the displays 158 and 159 may be the same as the respective portions 106A and 106B of the tablet 100 when the handheld device 150 is in the docked position. Also, while discussed above in the context of a first application 148A and second application 148B being displayed on the handheld device 150 and subsequently the tablet 100 after docking, it will be understood that a similar behavior may be exhibited with any screen (e.g., desktop, multi screen application executing in multi screen mode, empty screen, etc.).

The display 106 of the tablet 100 may have different dimensions than either of the displays 158 or 159 of the handheld device 150. Furthermore, the collective display area of the first and second displays 158 and 159 may be different than the display area of the display 106. For example, each of the displays 158 and 159 of the handheld device 150 may be, for example, 480 pixels by 800 pixels. Thus, a collective display area defined by the displays 158 and 159 may be 960 pixels by 800 pixels, in this example. However, the display 106 of the tablet 100, for example, may have a display area of 1200 pixels by 800 pixels. In this regard, applications may be scaled appropriately to be displayed on the display 106 of the tablet 100 once the handheld device 150 is docked with the tablet.

Figure 12:
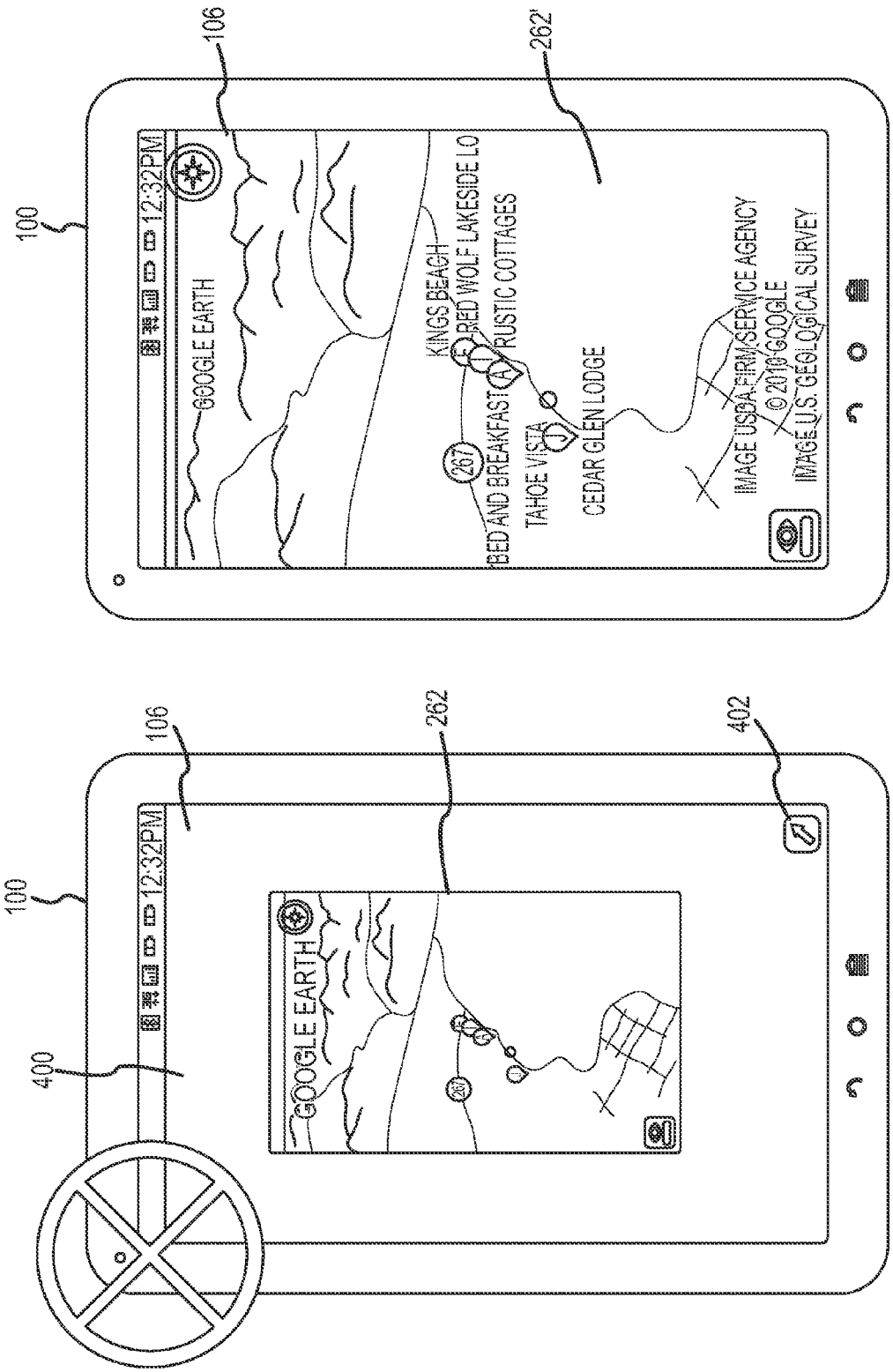
FIGS. 12 and 13 illustrate an embodiment of a screen displayed on the slave device in a portrait and landscape orientation, respectively.
Figure 13:
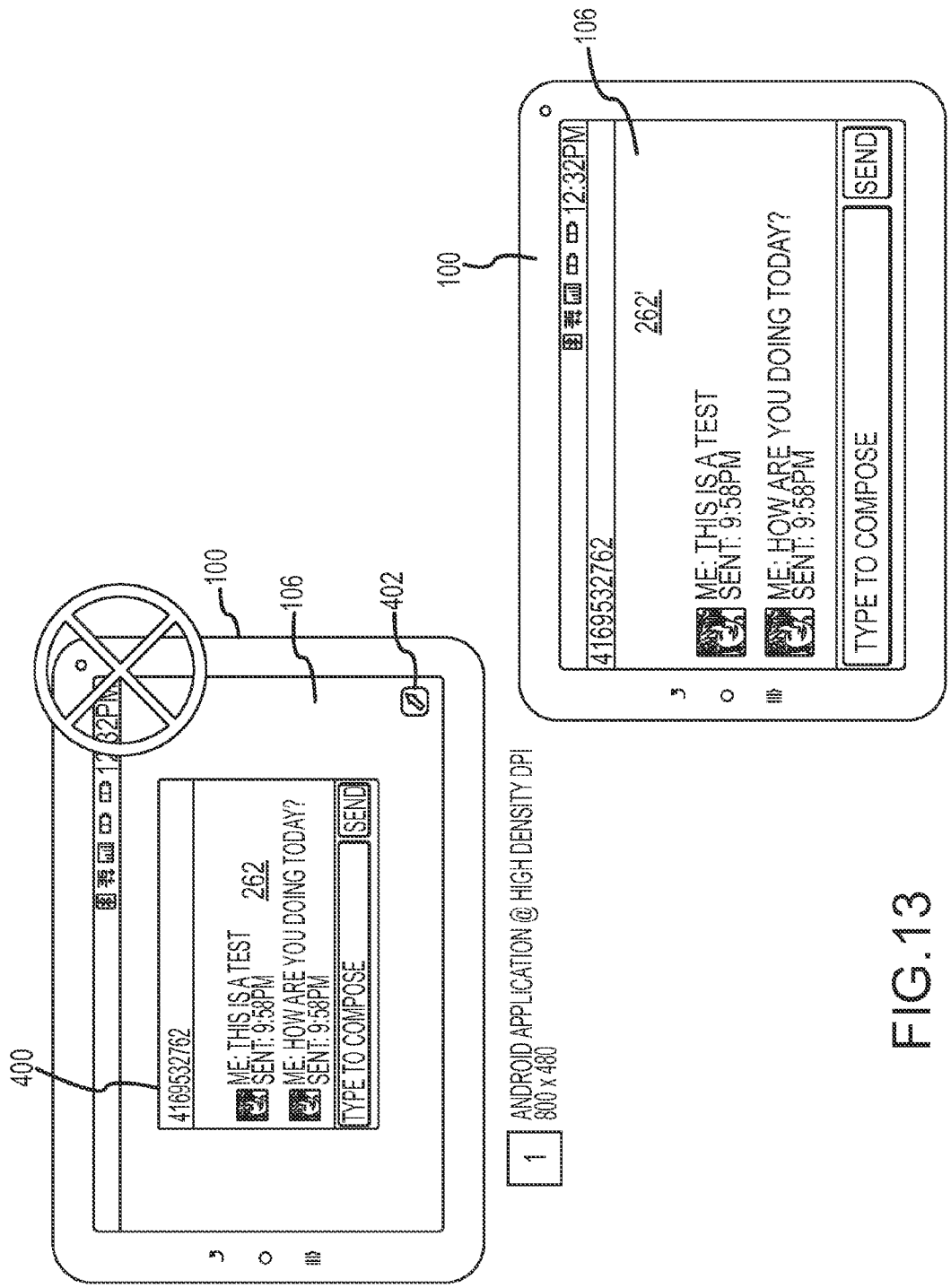

For example, FIGS. 12 and 13 that show a single application 262 displayed on the display 106 in portrait and landscape orientations respectively. FIGS. 12 and 13 demonstrate that a single application 262 (e.g., in this case a dual screen application that may be executed in single screen mode or multi screen mode) in the native size (e.g., 480 pixels by 800 pixels in the case of single screen mode and 960 by 800 pixels in multi screen mode) may not occupy the entire display 106 of the tablet 100. As such, unused display space 400 may be present. Accordingly, an input field 402 (e.g., a virtually represented button) may be provided to toggle between full display of the application 262 (as shown in the right side of FIGS. 12 and 13) and the native size of the application 262. The maximization of the application 262 to occupy the full display area may be accomplished by way simple scaling of the application or the expansion of the viewable area of the application as discussed above with regard to maximization of an application across multiple separate displays. Additionally, once in the full screen mode as depicted on the right side of FIGS. 12 and 13, an input field (e.g., similar to input field 402) may be provided to return to the native size of the application 262.

Figure 14:
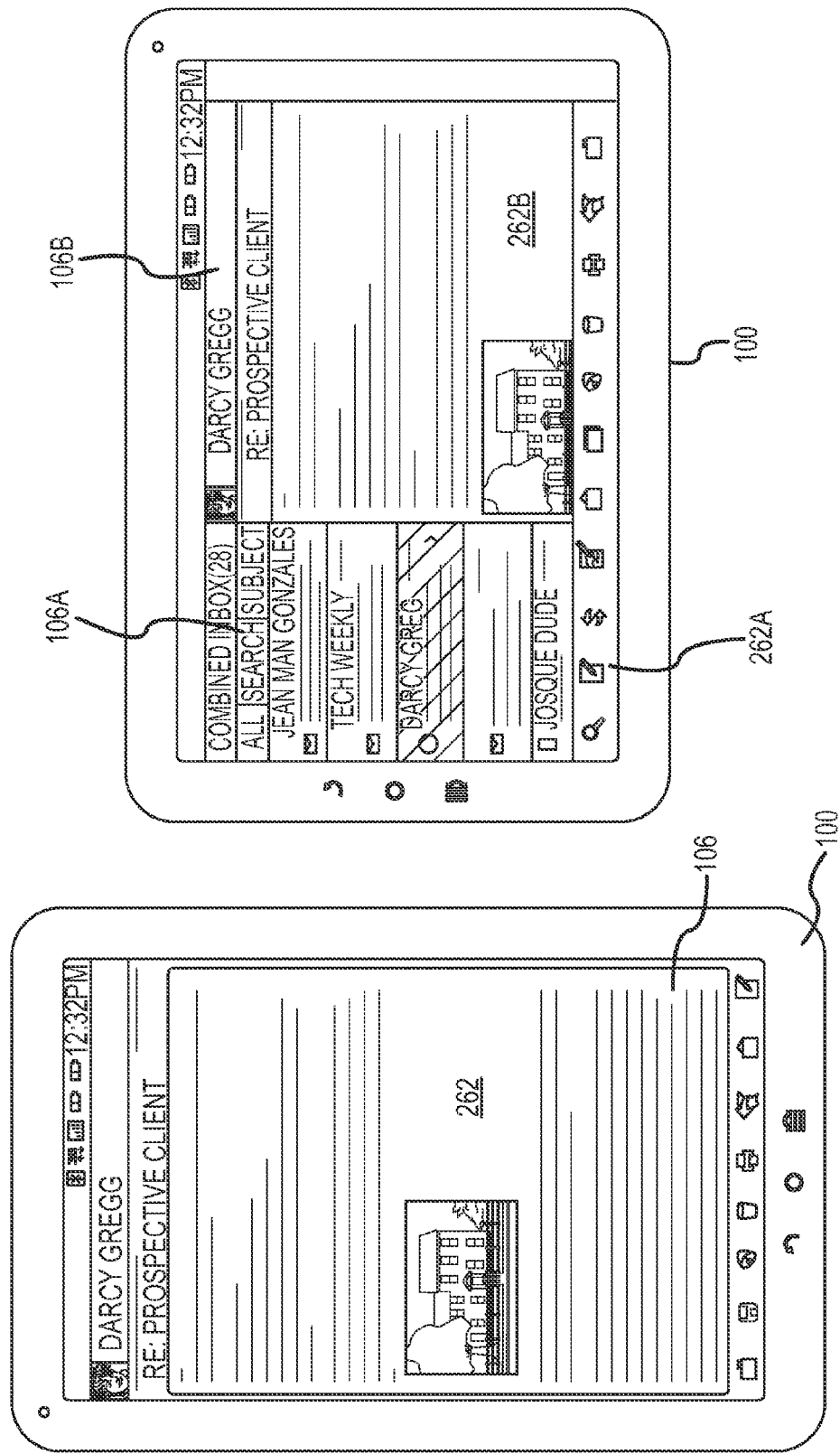
FIG. 14 illustrates the display of a multi screen application in a single screen portrait mode and a multi screen landscape mode, respectively.

With further reference to FIG. 14, a dual screen application may be displayed on the display 106 of the tablet 100 based on the orientation of the tablet 100. In this regard, the accelerometer 178 (shown in FIG. 2) of the handheld device 150 may be operative to resolve the orientation of the tablet 100 once the handheld device is docked with the tablet 100. As shown on the left side of FIG. 14, when the tablet 100 is in the portrait orientation 252, the application 262 may be shown in single screen mode such that the application 262 occupies substantially the entire display 106 (e.g., as discussed above with respect to FIGS. 12 and 13). Upon rotation of the tablet 100 to a landscape orientation 254 shown on the right side of FIG. 14, the application 262 may change to a multi screen mode such that a first screen 262A is displayed in a first portion 106A of the display 106 and a second portion 262B is shown in a second portion 106B of the display 106. This may mimic the operation of the handheld device 150 when rotated from a portrait orientation to a landscape orientation.

Figure 15:
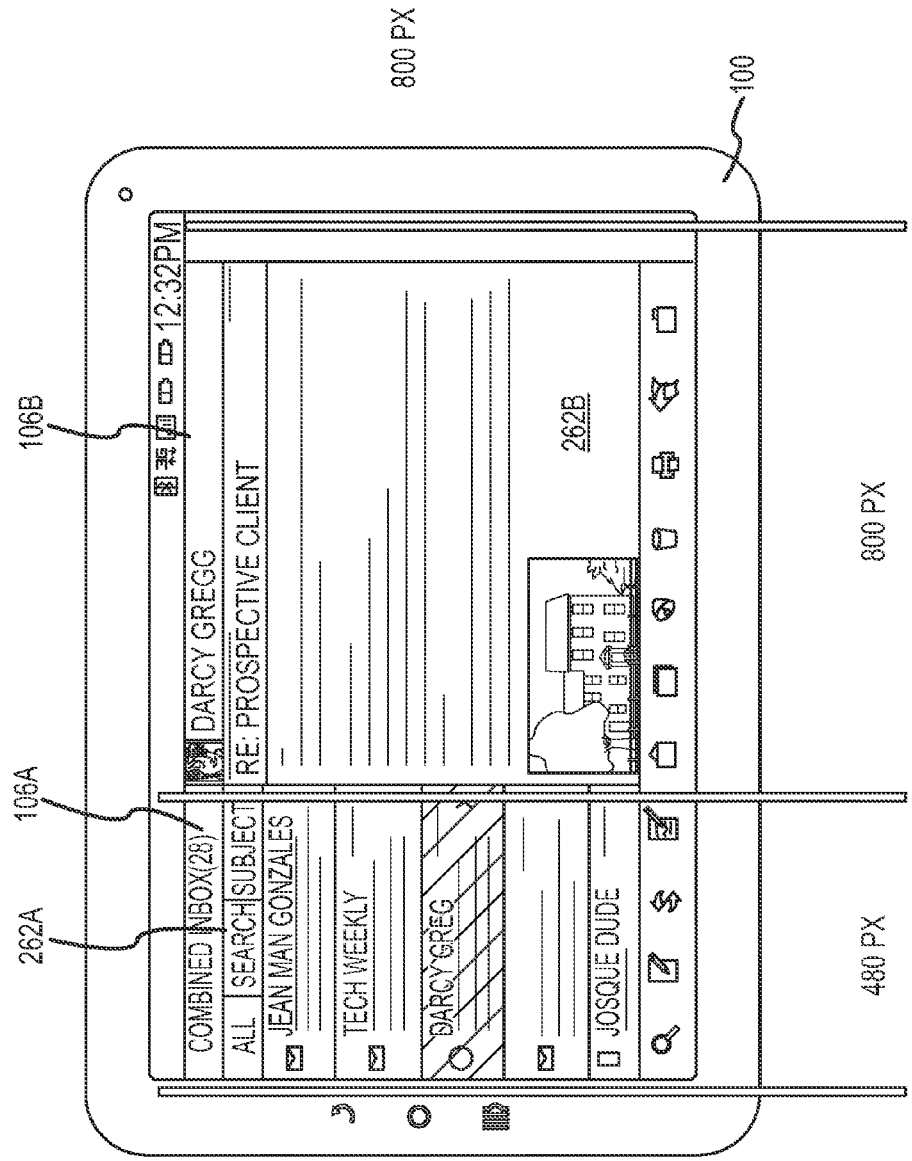
FIG. 15 illustrates one embodiment of a size of a multi screen application displayed on the slave device.

However, the change from single screen mode to multi screen mode of the application 262 when displayed on the tablet 100 may differ from the corresponding change that may occur with respect to the handheld device 150, in that the portions 106A and 106B may not be of equal size on the tablet. That is, when the application 262 changes to multi screen mode when displayed on the first and second displays 158 and 159 of the handheld device 150, the respective portions 262A and 262B of the application 262 may each be displayed on a corresponding one of the displays 158 and 159 and, thus, be of the same size (e.g., 480 pixels by 800 pixels). As depicted in FIG. 15, the first portion 106A of the display 106 may be of a different size than the second portion 106B of the display 106. Accordingly, the respective screens 262A and 262B of the application 262 may be of different size. For example, as shown in FIG. 15, the first screen 262A may be 480 pixels by 800 pixels. The second screen 262B may be 800 pixels by 800 pixels. The size of the respective portions 106A and 106B for multi screen applications may be variable. For example, different applications may dictate different sizes for the respective portions 106A and 106B of the tablet display 106. This may be possible because the portions of the tablet display 106 are virtual and may be controlled by software. As such, additional screens and portions (e.g., more than two screens) may be displayed in corresponding portions of the display 106.

Figure 16:
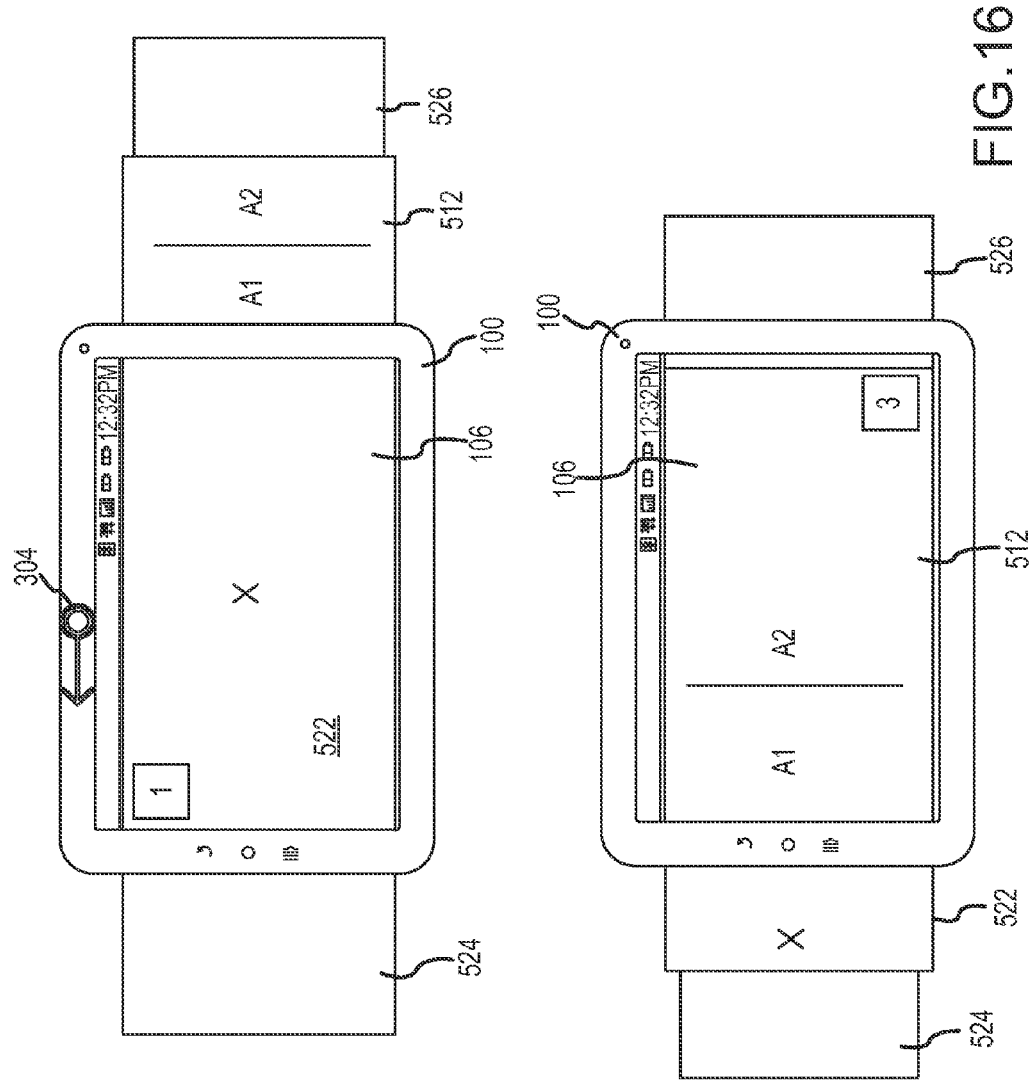
FIG. 16 illustrates one embodiment for the control of screens on the slave device in response to a gesture input.

With additional reference to FIG. 16, gesture inputs may be used to change the screen(s) displayed on the tablet display 106. The manipulation of the tablet 100 with use of gesture inputs may incorporate all of the gesture inputs discussed in the applications incorporated by reference above. In one particular example shown in FIG. 16, the tablet 100 may display Application X 522 on the display 106. As referenced above in FIG. 9, the orientation of the application (e.g., the logical order of the applications) may be maintained in memory. As such, Application Y 524, Application A 512, and Application Z 526, while shown in FIG. 13 for clarity may represent only the logical locations of the applications (e.g., to the left or right) with respect to Application X 522. In the top portion of FIG. 16, a drag gesture 304 may be received. In response, Application A 512 may be displayed on the display 106 after receipt of the drag 304. As can be appreciated from the movement of the application stack between the top and bottom portions of FIG. 13, the logical position of the applications may be maintained after receipt of the drag 304. In this regard, a gesture may be used to change the application displayed on the display 106 of the tablet 100.

Figure 17:
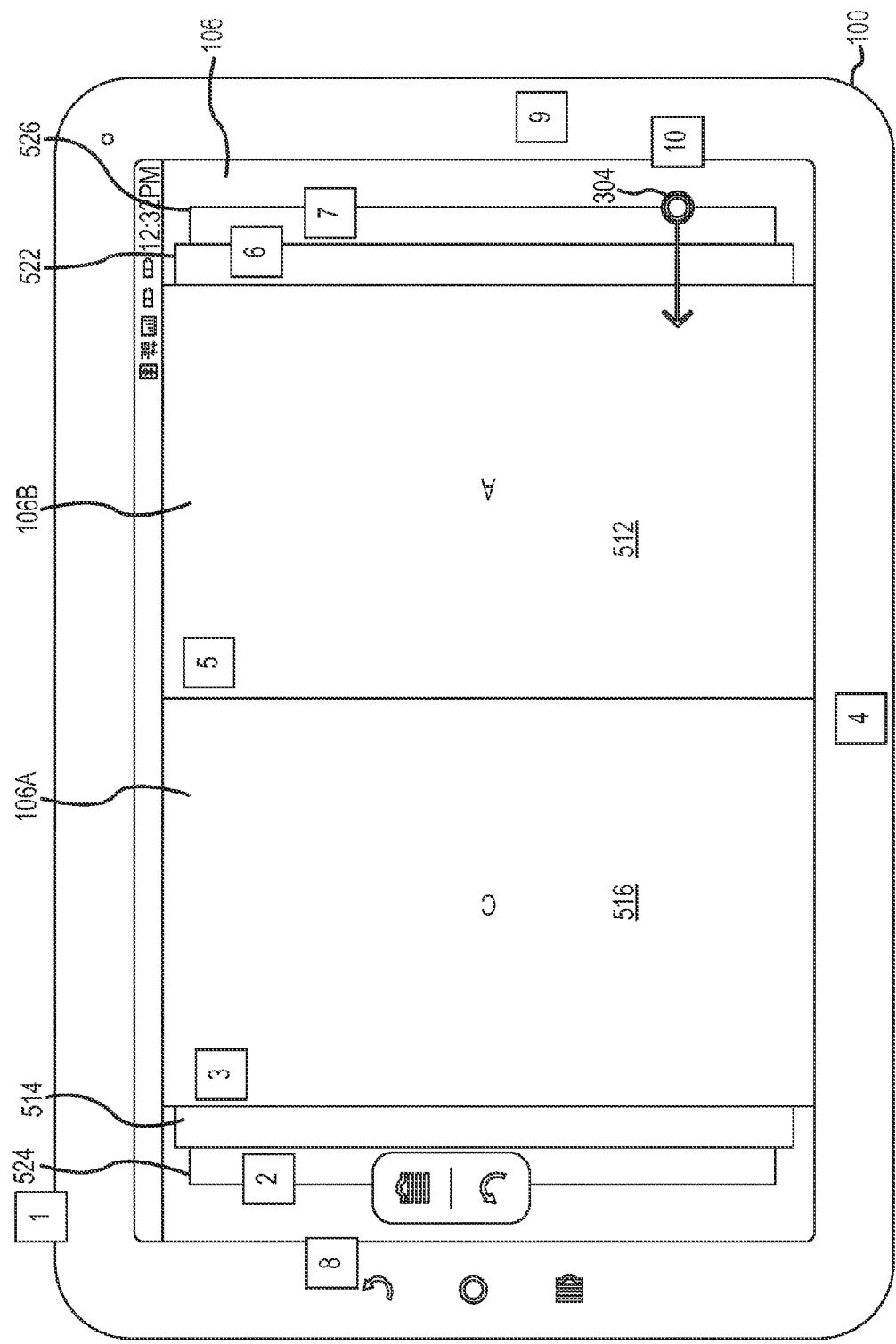
FIGS. 17 and 18 illustrate the display of a plurality of screens on the slave device such that the logical positions of the screens can be appreciated.

With additional reference to FIG. 17, the logical position of the applications as depicted in FIG. 9 above may be physically displayed on the tablet display 106. For example, FIG. 17 shows Application C 516 displayed in a first portion 106A of the tablet display 106 and Application A 512 displayed in a second portion 106B of the tablet display 106. As the first portion 106A and second portion 106B may be set to any appropriate size (e.g., not be constrained by physical hardware limitations), additional display space may be dedicated to displaying the other applications not actively displayed. For example, it may be that Application C 516 and Application A 512 are displayed in a native 480 pixel by 800 pixel size. Thus, only 960 pixels by 800 pixels of the display 106 are occupied by Application A 512 and Application C 516. In the embodiment wherein the display 106 is 1200 pixels by 800 pixels, the remainder of the display 106 may be dedicated to showing other applications not actively displayed. For example, the display 106 may show Applications B 514 and Application Y 524 to the left of Application C 516 in the first portion 106A of the display. Also, Application X 522 and Application Z 526 may be to the right of Application A 512. The applications not actively displayed (e.g., to the right or left of the actively displayed screens in the first portion 106A and second portion 106B) may be representations of the applications (e.g., a screen shot, icon, or some other appropriate representation thereof).

Also shown in FIG. 17, a gesture such as a drag 304 may be received to change the actively displayed screens. Thus, the drag gesture 304 received in FIG. 17 may result in Application A 512 moving to the first display portion 106A and Application X 522 moving to the second display portion 106B. With additional reference to FIG. 18, in addition to the logical position of application screens being displayed, a desktop screen 138 may also be provided in the application stack. As such, the desktop 138 may be displayed in one of the first or second display portions 106A and 106B.

Figure 18:
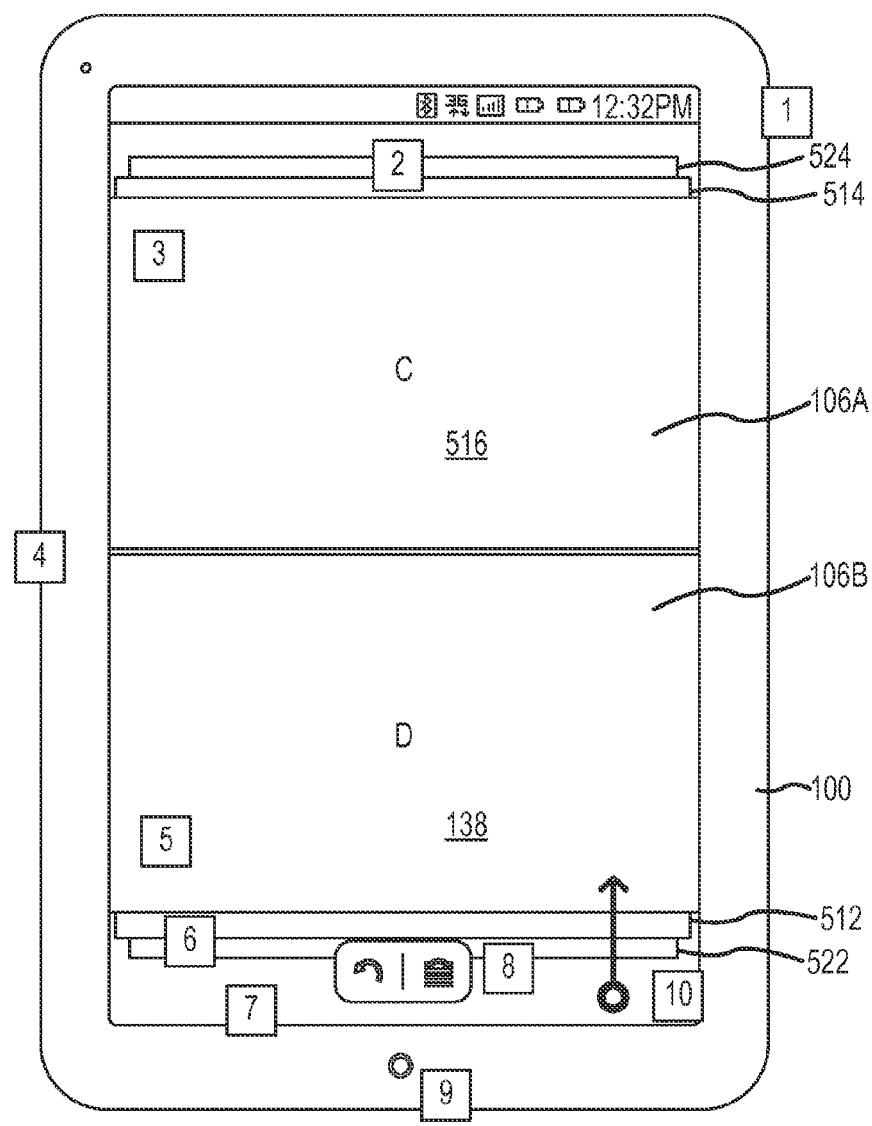

The configuration shown in FIGS. 17 and 18 may be activated upon a command by the user. For example, a particular gesture (e.g., a pinch 308, spread 310, etc.) may activate the configuration wherein the logical position of the applications is shown. Additionally, a command may exit the configuration shown in FIGS. 17 and 18, such that the first and second portions 106A and 106B expand to occupy substantially all of the display 106 such that the logical positions of the screens are not shown on the display 106. Thus, the actively displayed screens in the first portion 106A and 106B may be expanded to occupy the full display 106. In this regard, the configuration shown in FIGS. 17 and 18 may be selected, the screens navigated using gestures, and once the desired screens are displayed, the screens may be maximized to occupy the full display 106 (e.g., as shown in FIGS. 19 and 20).

Figure 19:
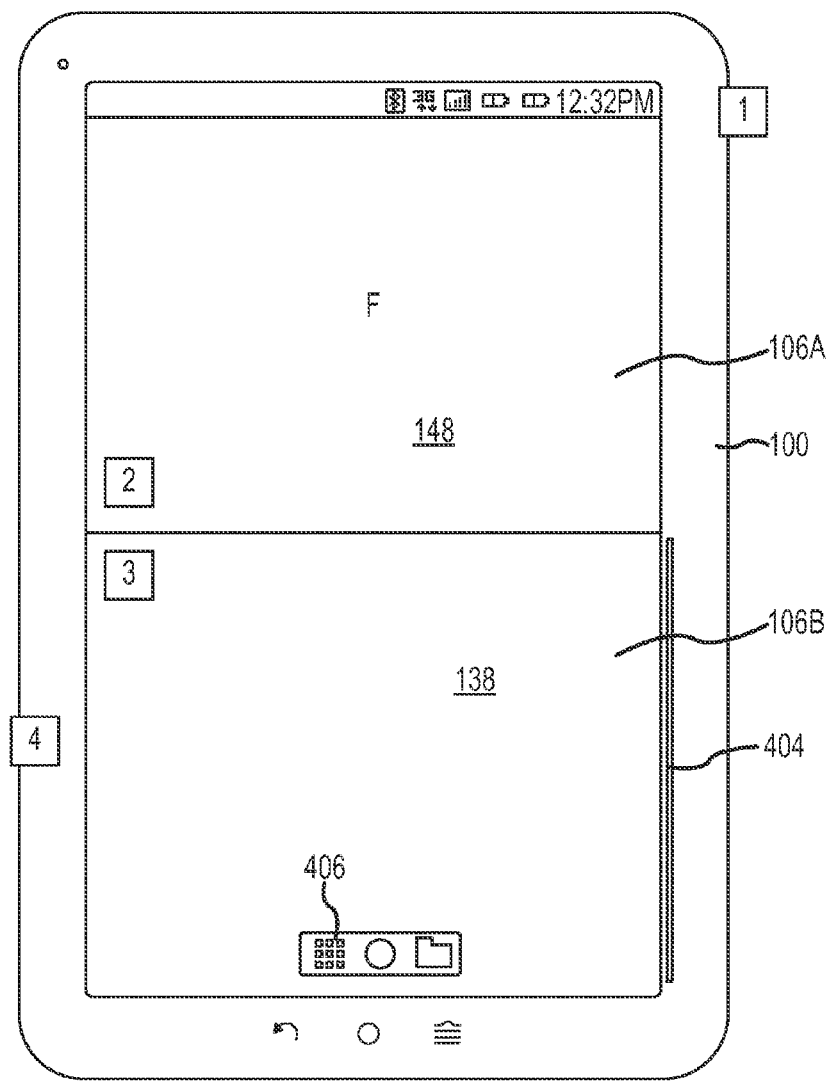
FIG. 19 illustrates the simultaneous display of an application screen and a desktop screen on the slave device.
Figure 20:
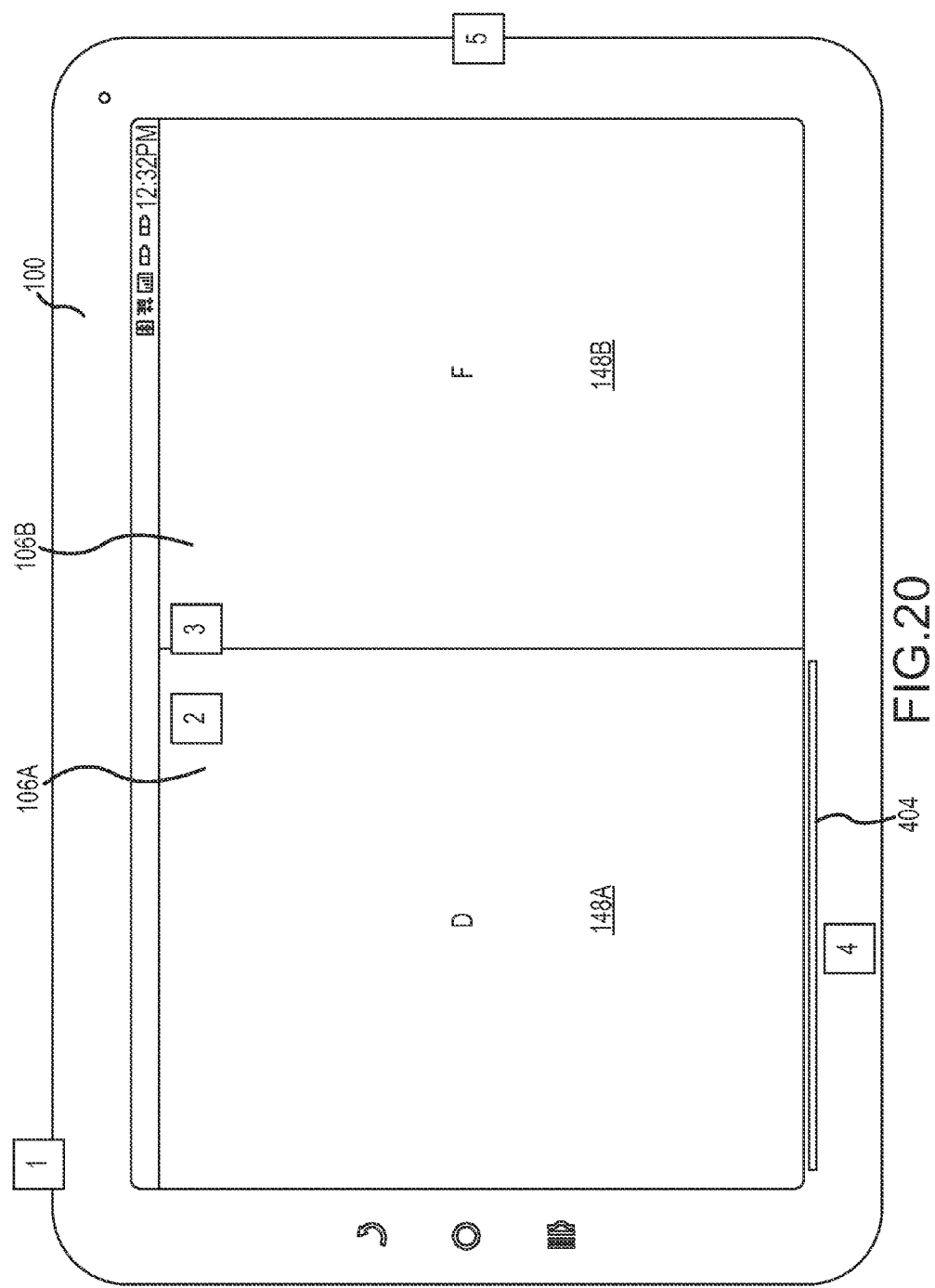
FIG. 20 illustrates the simultaneous display of two application screens on the slave device.
Figure 21:
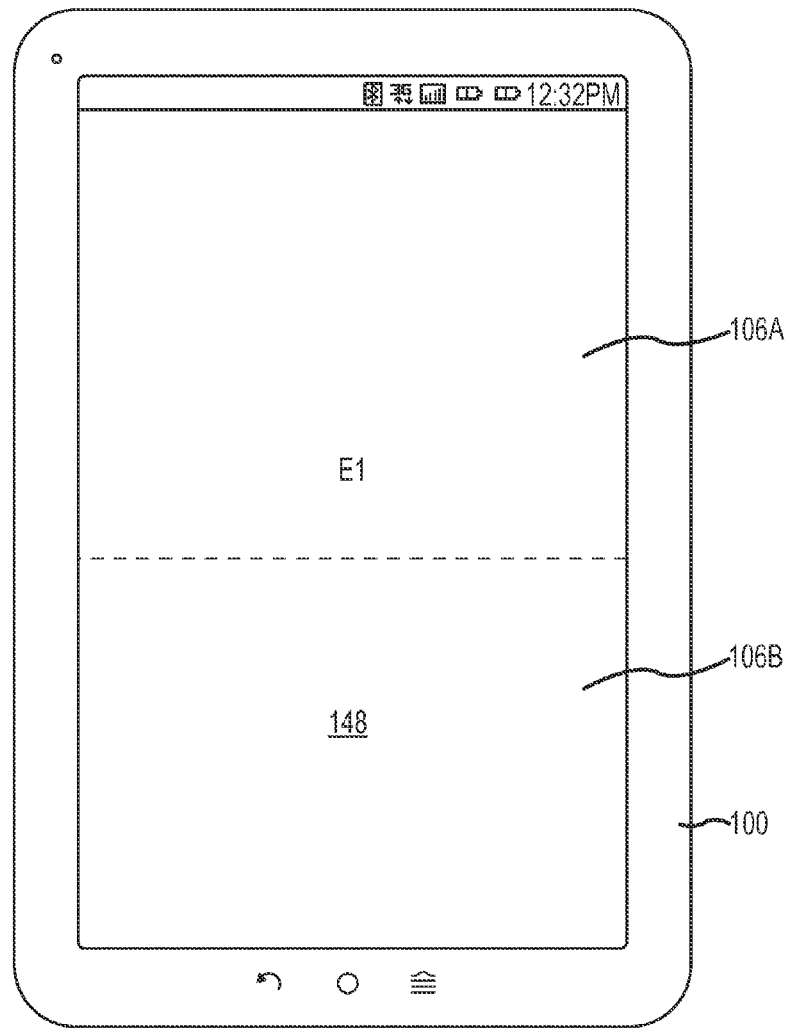
FIG. 21 illustrates the display of an application screen in a portrait orientation that occupies the entire display of the slave device.

Continuing with reference to FIGS. 19 and 20, FIG. 19 shows the tablet 100 in a portrait orientation and FIG. 20 shows the tablet 100 in a landscape orientation. The first portion 106A and second portion 106B may collectively occupy the entire tablet display 106. As such, the first portion 106A and second portion 106B may correspond to, and act in a manner similar to, the first display 158 and second display 159 discussed above. For instance, a single multi screen application may be maximized across both the first and second portions 106A and 106B; a single screen application 148 may be maximized to occupy both the first portion 106A and second portion 106B (as shown in FIG. 21); a first application 148 may be displayed in the first display portion 106A and a desktop screen 138 may be displayed in the second portion 106B (as shown in FIG. 19); or a first application 148A may be displayed in the first display portion 106A and a second application 148B may be displayed in a second portion 106B. With reference to FIGS. 19 and 20, a focus indicator 404 may be provided to indicate to a user which of the screens displayed on the display 106 is the focus of the device (e.g., which screen is actively receiving inputs from the device). The focus indicator 404 may be a portion of the display 106 dedicated to displaying the focus indicator 404 or may be provided separately from the display 106 (e.g., a light or other indicator provided adjacent to the display 106). It will be appreciated the focus indicator 404 may not be active when a single application occupies the entire display 106 as shown in FIG. 21 as there may be no need to indicate which screen is the focus of the device.

With additional reference to FIG. 19, when a desktop screen 138 occupies one of the first or second portions 106A or 106B, the functionality associated with the desktop screens may be active. For example, icons 406 appearing on the desktop 138 may be selected by a user. Furthermore, widgets appearing on the desktop (not shown in FIG. 19) may be active and display information or provide interactive features to a user. Furthermore, as shown in FIG. 22, the desktop 138 may occupy both the first portion 106A and second portion 106B of the display. The desktop 138 may be shown in a portrait orientation as shown on the left side of FIG. 22 or a landscape orientation as shown on the right of FIG. 22.

Figure 23:
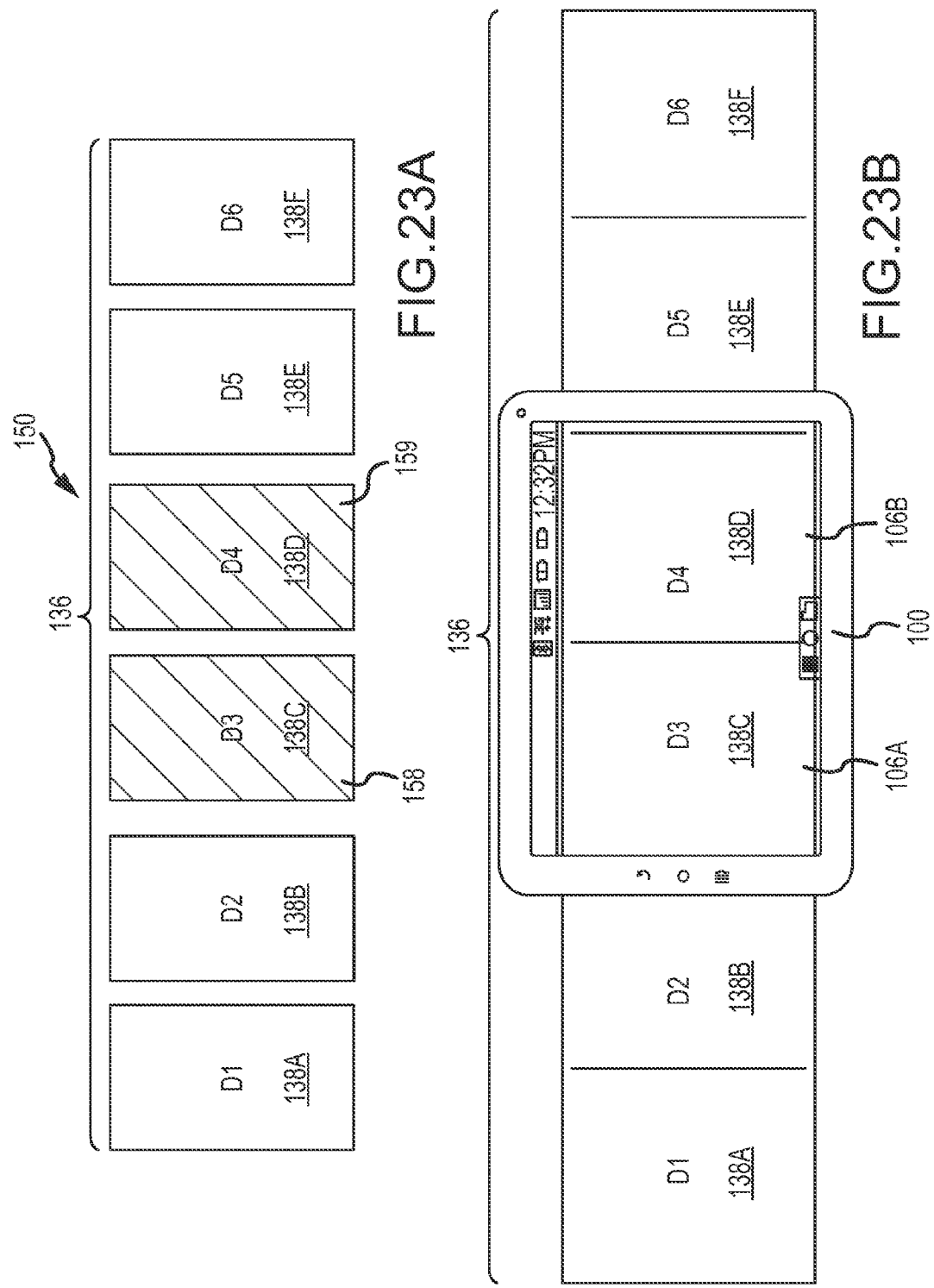
FIGS. 23A, 23B and 24 illustrate a desktop sequence in relation to devices for displaying the desktop sequence.

FIG. 23A shows a desktop sequence 136 as shown above in FIG. 5A. Desktop screens 138C and 138D may be actively displayed on the first display 158 and second display 159 of the handheld device 150. The logical position of the other desktop screens in the desktop sequence 136 is also shown. It may be appreciated that each desktop screen 138 may include different information (e.g., unique widgets, unique information, unique icons, etc.) such that the desktop screens 138 may be selectively moved among the displays 158 and 159 to access the different information appearing on each desktop screen 138. This principle holds true in the context of the tablet 100 shown in FIG. 23B. As such, respective ones of the desktop screens (e.g., 138C and 138D) may be displayed in the first portion 106A and second portion 106B of the display 106. Similarly, the desktop screens 138 may be selectively moved among the portions 106A and 106B to access each desktop screen 138. It will be appreciated that each desktop screen 138 may be scaled appropriately to be displayed on the portions 106A and 106B, which may be of a larger size than the first and second displays 158 and 159 as discussed above.

Figure 24:
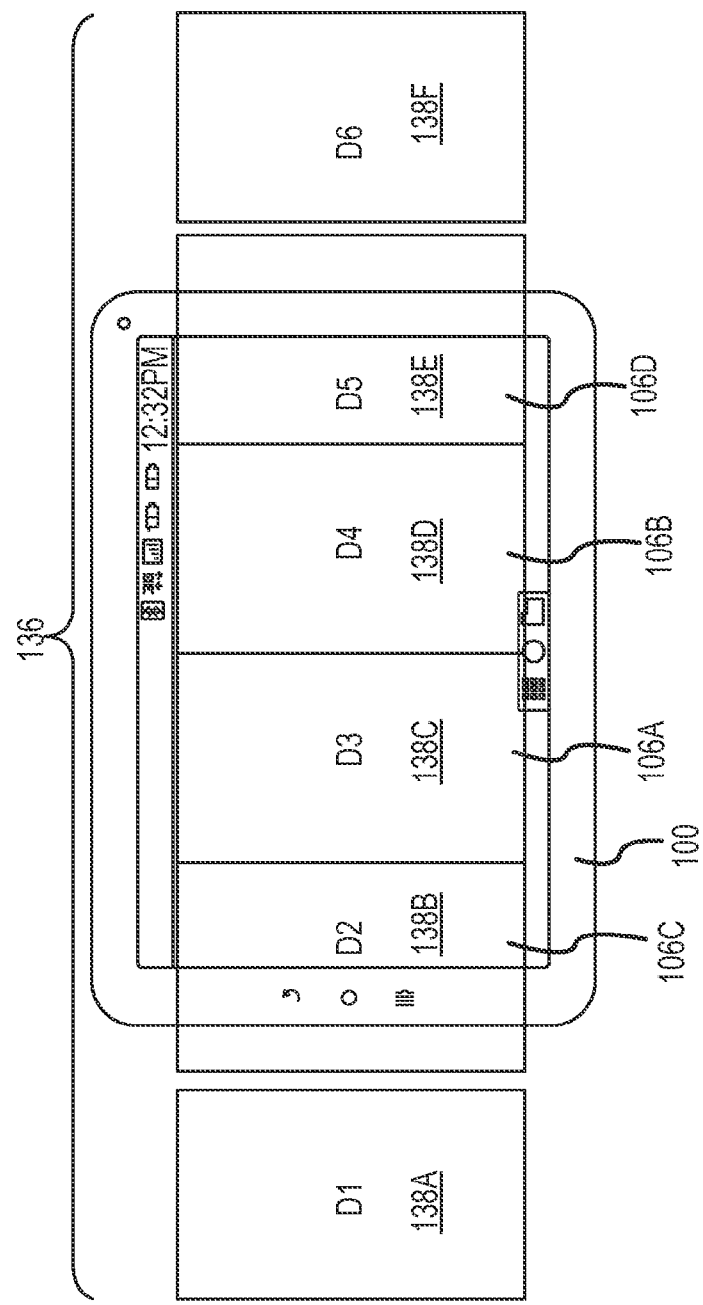

Alternatively, as shown in FIG. 24, the desktop screens 138 may remain in their native size as shown in the first display 158 and second display 159 of the handheld device 150. In this regard, the first portion 106A and second portion 106B of the tablet display 106 may be maintained in the native size of the desktop screens 138 (e.g., 480 pixels by 800 pixels). As such, third and forth portions 106C and 106D may remain as the tablet display 106 may be larger than the collective display areas of the first display 158 and second display 159 as discussed above. Accordingly, a portion of other desktop screens 138 may be displayed in the third and fourth portions 106C and 106D. In this regard, the desktop screens not in full view (e.g., desktop screens 138B and 138E in FIG. 24) may be "hinted" at, but not fully shown. The features (e.g., widgets, icons, etc.) of the hinted desktops screens 138B and 138E may not be active when in partial view, but may become active if moved to one of the first portion 106A or second portion 106B.

Figure 25:
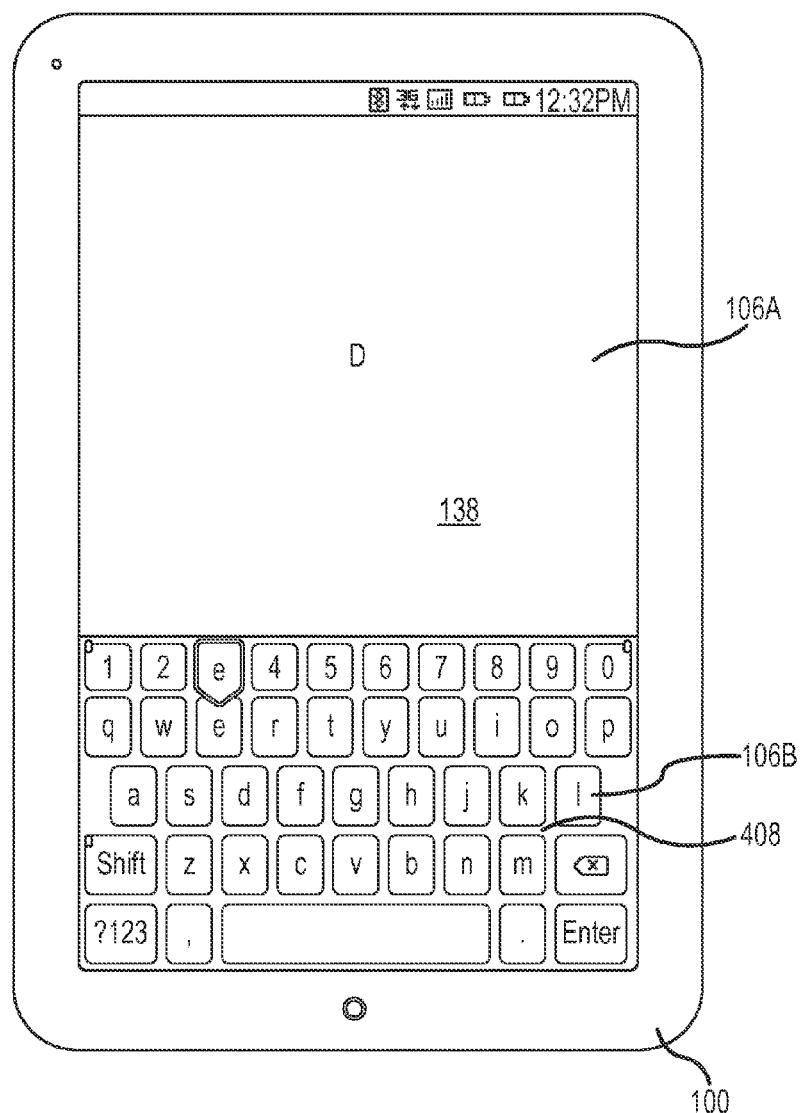
FIG. 25 illustrates the display of a keyboard on the slave device.
Figure 26:
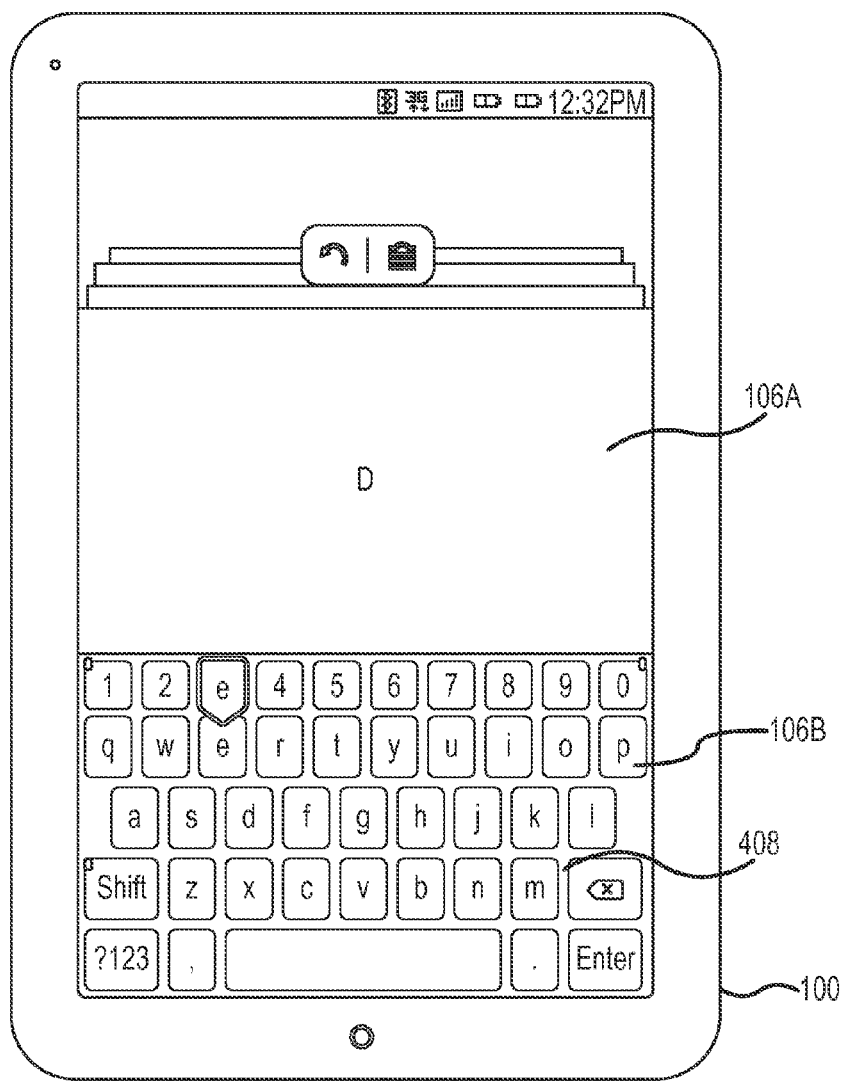
FIG. 26 illustrates the display of a keyboard and multiple screens such that the logical positioning of the screens is visible.

With reference to FIG. 25, the tablet 100 may be operative to display a keyboard 408 for receipt of input from a user. The keyboard 408 may be provided in the second portion 106B of the tablet display 106. In this regard, the second portion 106B may be scaled to correspond with the size of the keyboard 408. The first portion 106A may display another screen that is the target of the keyboard input. For example, as shown, the first portion 106A includes a desktop screen 138, however, a single screen application, a multi screen application operating in single screen mode, a multi screen application operating in multi screen mode, or some other appropriate screen may be displayed in the first portion 106A. Furthermore, the first portion 106A may be further divided into additional screen portions that behave in a manner described above wherein each of the additional portions may act to display a screen of an application while simultaneously displaying the keyboard in portion 106B. With additional reference to FIG. 26, the first portion 106A may display the logical positions of the screens associated with the first portion 106A as described above with respect to FIGS. 17 and 18 while maintaining the keyboard 408 displayed in the second portion 106B.

FIG. 27 depicts one embodiment for the operation of a drawer 410 of the tablet 100. A drawer may generally describe a selectively displayable screen that may contain data or information useful to the user. The drawer may be opened (i.e., selectively displayed) by a user by manipulation of a graphical portion. For example, a handle or other graphical portion may be provided to access the drawer. In this regard, a drawer may be operative to be opened into view on a display (e.g., from the periphery of the display) such that the rendered display resembles a drawer being opened from off display to reveal the contents of the drawer. A user may access a drawer by dragging open the drawer by selecting the handle or other graphical portion that allows the drawer to open (that is, slide into view). As such, a drawer may be opened to occupy a majority of a display or may be partially opened to only a partial extent that covers a portion of the display. A subsequent user input may allow the drawer to slide back into its original off display position thus revealing the screen obscured upon opening the drawer.

In this regard, the drawer may be accessed by the user and may contain various information or data. For instance, a drawer may be opened which contains and subsequently displays application data including a listing of the applications stored on the handheld computing device that can be executed thereon. This list may be a text list or include icons corresponding to the applications. The applications may be launched directly from the drawer by selecting the application when the drawer is open. Additionally or alternatively, a drawer may contain other data such as by way of example, notification data, contact data, calendar data, weather data, or other appropriate data a user may access. For instance, the notification data may include information relating to messages (e.g., SMS messages, voicemails, emails, chats, etc) that have been sent by or received by the handheld computing device. The contact data may include contact information from an address book or the like stored on the device. Additionally, other types of information to which quick access may be provided may be provided in the drawer. The drawer may additionally contain links or other objects that may be selected by the user.

For instance, message notifications (e.g., upon receipt of a SMS message, e-mail, etc.) may be displayed in a notification drawer that may be accessed by the user. The drawer may contain a list of received messages including information (e.g., a message subject, time of receipt, sender, etc.) related to each corresponding message. Furthermore, the message notifications may be linked objects, whereupon selection of the message, a messaging application executes or is brought to the foreground so that a user may read the full message, respond, etc. As can be appreciated from FIG. 27, the drawer 410 may be accessed in either a portrait or landscape orientation.

Along the top of the display 106 may be a status bar portion. The status bar portion 412 and may display various information to a user including, but not limited to, cellular signal strength, battery life information, cellular carrier information, services being executed by the handheld computing device, and other pertinent information. A drag gesture 304A may be input by the user that, for instance, may originate adjacent to the status bar portion 412 and be in a general downward direction (i.e., toward the bottom of the display 106 opposite the status bar portion 412). The result may be a drawer portion 410 may be opened in the display 106. Thus, the screen (e.g., desktop screen 138) previously displayed by the display 106 is covered by the drawer portion 410. In alternate embodiments, the drawer portion 410 may be partially opened to only cover a portion of the display 106. As shown in FIG. 27, the drag gesture 304A may be subsequently applied to the handle 414 to resize the drawer portion 410. The drawer portion 410 may include information as described above. A handle 414 may be provided at the bottom of the drawer portion 414. The status portion 412 may remain displayed at the top of the screen as is shown in FIG. 27. The drawer portion 414 may be subsequently closed by a gesture (e.g., drag 304B) originating near the handle 414 in an upward direction (i.e., toward the top of the display 106 adjacent the status bar portion 412) so as to close the drawer portion 410.

The drawer 410 may also include a number of setting controls 416. For example, these setting controls 416 may be used to control standard device functions such as toggling on or off the WiFi radio, Bluetooth radio, or other components of the handheld device 150. The setting controls 416 may also include a screen lock toggle that will lock the screen, thus not allowing it to be rotated with a change in orientation of the device. When activated, a corresponding screen lock icon may be displayed in the status bar 412. The setting controls 416 may also include a sing/dual application toggle. Thus may allow various display states of the tablet 100 to be set (e.g., single application mode wherein a single application occupies substantially all of the display 106, dual application mode wherein more than one application is displayed in corresponding portions of the display 106, and single application lock wherein a single application is displayed and cannot be modified using gesture inputs). Also, the setting controls 416 may include power management options for the tablet 100 and/or handheld device 150.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for use with docking portable electronic devices, comprising:
   displaying, on a master device, a user interface, wherein a plurality of screens are displayed on corresponding ones of a plurality of master device displays;
   docking the master device with a slave device;
   adapting the user interface to be displayed on a slave device display; and
   dividing the slave device display into a plurality of display portions, each of the display portions corresponding to a respective one of the plurality of master device displays,
   wherein each screen displayed on one of the plurality of master device displays is displayed on one of the plurality of display portions of the slave device display.

2. The method according to claim 1, wherein the plurality of screens correspond to one or more applications executing on the master device.

3. The method according to claim 1, wherein the docking comprises establishing communication between the master device and one or more hardware components of the slave device.

4. The method according to claim 1, wherein the adapting comprises resizing at least one of the screens to be displayed on the slave device display.

5. The method according to claim 4, wherein the adapting comprise changing the orientation of the screen to be displayed on the slave device display.

6. The method according to claim 5, wherein the slave device is responsive to gesture inputs to control the display of the plurality of screens on the plurality of display portions of the slave device display when the master device is docked with the slave device in a manner corresponding to the control of the plurality screens on the plurality of master device displays when the master device is not docked with the slave device.

7. The method according to claim 1, wherein the dividing comprises allocating at least a first display area of the slave device display to a first portion and at least a second display area of the slave device display to a second portion.

8. The method according to claim 7, wherein the first display portion corresponds to a first master device display and the second display portion corresponds to a second master device display.

9. The method according to claim 1, wherein the master device comprises a handheld device and the slave device comprises a tablet.

10. A system for docking of portable electronic devices, comprising:
    a master device having a plurality of master device displays, wherein the plurality of master device displays are operable to display one or more screens thereon; and
    a slave device having a slave device display, wherein the slave device is operable to receive the master device in a docked position and, when in the docked position, the master device is in operative communication with the slave device display,
    wherein, when in said docked position, the master device is operable to divide the slave device display into a plurality of display portions corresponding with the plurality of master device displays, and wherein the one or more screens displayed on the plurality of master device displays are displayable on corresponding ones of the plurality of display portions of the slave device display.

11. The system according to claim 10, wherein the master device is a handheld device and the slave device is a tablet device.

12. The system according to claim 11, wherein the handheld device includes a first display and a second display, and wherein the slaved device display is divided into a first display portion corresponding to the first display and a second display portion corresponding to the second display.

13. The system according to claim 10, wherein at least one of the one or more screens is resized when displayed on a corresponding one of the plurality of display portions of the slave device display.

14. The system according to claim 13, wherein an orientation of at least one of the one or more screens is changed when displayed on a corresponding one of the plurality of display portions of the slave device display.

15. The system according to claim 10, wherein, when not in the docked position, the master device is operable to control the display of the one or more screens on the plurality of master device displays in response to received gesture inputs, and, when in the docked position, the master device is operable to control the display of the one or more screens on the plurality of display portions of the slave device display.

16. The system according to claim 15, wherein the control of the display of the one or more screens in response to the received gesture inputs on the plurality of display portions of the slave device display is substantially the same as the control of the display of the one or more screens in response to the received gesture inputs on the plurality of master device displays.

17. The system according to claim 16, wherein the master device includes a master device gesture sensor adjacent to the plurality of master device displays and wherein the slave device includes a slave device gesture sensor adjacent to the slave device display.

18. The system according to claim 10, wherein the slave device includes a retention mechanism for receivably engaging the master device in the docked position.

19. A slave device, comprising:
    a slave device display; and
    a docking member operable to receive a master device in a docked position, wherein, when in the docked position, the master device is in operative communication with the slave device display,
    wherein, when in said docked position, the master device is operable to divide the slave device display into a plurality of display portions corresponding with a plurality of master device displays, and wherein one or more screens displayed on the plurality of master device displays are displayable on the corresponding portions of the slave device display.

20. A master device, comprising
    a plurality of master device displays, wherein the plurality of master device displays are operable to display one or more screens thereon; and a communication port operable to establish operative communication with a slave device having a slave device display, wherein the master device is receivably engageable with the slave device in a docked position, wherein, when in the docked position, the master device is in operative communication with the slave device display;

wherein, when in said docked position, said master device is operable to divide the slave device display into a plurality of display portions corresponding with the plurality of master device displays, and wherein the one or more screens displayed on the plurality of master device displays are displayable on the corresponding portions of the slave device display.

* * * * *